United States Patent
Okada et al.

(10) Patent No.: US 7,729,266 B2
(45) Date of Patent: Jun. 1, 2010

(54) NETWORK LOAD DETECTION SYSTEM, METHOD, APPARATUS, AND PROGRAM

(75) Inventors: Sumiyo Okada, Kawasaki (JP); Noriyuki Fukuyama, Kawasaki (JP); Masanobu Morinaga, Kawasaki (JP); Hideaki Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 200 days.

(21) Appl. No.: 12/037,702

(22) Filed: Feb. 26, 2008

(65) Prior Publication Data

US 2008/0212488 A1 Sep. 4, 2008

(30) Foreign Application Priority Data

Mar. 1, 2007 (JP) ............................... 2007-051101

(51) Int. Cl.
*H04L 12/26* (2006.01)
(52) U.S. Cl. ...................................... 370/250; 370/252
(58) Field of Classification Search ................. 370/250, 370/252
See application file for complete search history.

(56) References Cited

U.S. PATENT DOCUMENTS

2003/0053419 A1 3/2003 Kanazawa et al.

FOREIGN PATENT DOCUMENTS

| JP | A 6-164599 | 6/1994 |
|----|------------|--------|
| JP | A 8-8909 | 1/1996 |
| JP | A 2004-7339 | 1/2004 |
| JP | A 2005-184471 | 7/2005 |
| JP | A 2005-236906 | 9/2005 |

*Primary Examiner*—Melvin Marcelo
(74) *Attorney, Agent, or Firm*—Greer, Burns & Crain, Ltd.

(57) ABSTRACT

A system includes a unit transmitting test packets to a to-be-measured communication link at a first time interval, a unit transmitting burst loads each including a series of load packets to the communication link at a second time interval, a unit performing measurement of delay time periods in a manner that a plurality of test packets transmitted by varying elapsed time periods each from an instance of transmission of the burst load to an instance of transmission of the test packet are received from the communication link in a fluctuating time interval, a unit generating delay distributions indicative of packet occurrence frequencies in relation to a delay time period of the communication link in accordance with the measured delay time periods, and a unit calculating a network load in accordance with occurrence frequencies in a specific section of the generated delay distributions.

22 Claims, 14 Drawing Sheets

NETWORK LOAD DETECTION SYSTEM, METHOD, APPARATUS, AND PROGRAM

CROSS-REFERENCE TO RELATED APPLICATIONS

This application is based upon and claims the benefit of priority from the prior Japanese Patent Application No. 2007-51101 filed on Mar. 1, 2007, the entire contents of which are incorporated herein by reference.

TECHNICAL FIELD

The present invention relates to a network load detection system, method, apparatus, and program for detecting a load status of a communication link set in a packet network, such as a VoIP (voice over Internet protocol) network. More specifically, the present invention relates to a network load detection system, method, apparatus, and program for detecting a load status in real time through a temporarily special or artificial load in a communication link.

BACKGROUND OF THE INVENTION

In recent years, communication systems, such as IP phones, using a packet network such as a VoIP network, have been widely used. In this case, in order to maintain communication quality in the packet network, such as the VoIP network, it is important to preliminarily verify a communication status in the event the communication load is increased.

Such a communication status can be preliminarily verified in such a manner that communication statuses corresponding to various communication loads are preliminarily retained as base data, and a communication status of VoIP communication or the like between users is compared to the base data. Thereby, an onset of communication quality deterioration can be detected, and quality deterioration can be predicted.

As an example, a method for verifying a communication status for use as base data is disclosed in Japanese Patent Application Laid-Open (JP-A) No. 2005-184471 ("patent publication", herebelow). According to the method, the load of a communications device is varied, and the reaction of the communications device is measured across a packet communications network.

However, various inconveniences take place when the method for measuring the status of a communications device described in JP-A-2005-184471 is adapted to measure a communication status of a communication link set in a packet network. In that system, the communication status of the communication link is measured in the manner that the load on the communications device described in the publication is set as a load on the communication link, and the load on the communication link is measured by being varied.

In the case of the method described in JP-A-2005-184471, a processing load is imposed on the communications device, so that the method does not influence other communications devices as well as the communication link and communication network. However, the method imposes a communication load on a communication link, which can cause adverse effects on other communication, such as communication failure on in-operation communication services.

An object of the present invention is to provide a network load detection system, method, apparatus, and program for detecting a network load by imposing burst loads on an in-operation communication link without causing adverse effects on other communications, such as communication failure on in-operation communication services.

SUMMARY

According to one embodiment of the present invention, a network load detection system includes a test packet transmitting unit for transmitting test packets to a to-be-measured communication link at a predetermined first time interval; a burst load transmitting unit for transmitting burst loads each including a series of a plurality of load packets to the communication link at a predetermined second time interval different from the first time interval; a delay time measuring unit for performing measurement of delay time periods in a manner that a plurality of test packets transmitted by varying elapsed time periods each from transmission of the burst load to transmission of the test packet are received from the communication link in a fluctuating time interval determined in accordance with the first and second time periods, and delay time periods corresponding to the elapsed time periods for the respective test packets are measured; a delay distribution generating unit for generating delay distributions indicative of packet occurrence frequencies in relation to a delay time period of the communication link in accordance with the measured delay time periods; and a load calculating unit for calculating a network load in accordance with occurrence frequencies in a specific section of the generated delay distributions.

Preferably, the test packet transmitting unit and the burst load transmitting unit, respectively, initiate the transmission of the test packets and the transmission of the burst loads by synchronizing transmission initiation timings thereof with one another.

Preferably, the delay time measuring unit sets the fluctuating time interval to an absolute value of a value obtained in a manner that a product of a multiplication of the first time interval times the second time interval is divided by a greatest common divisor of the first time interval and the second time interval.

$$T0 = |(T1 \times T2)/(\gcd(T1, T2))| (\gcd = \text{greatest common divisor})$$

For example, the delay time measuring unit sets a fluctuating time interval $T0$ to an absolute value of a value obtained in a manner that a product of a multiplication of the first time interval ($T1$) times the second time interval ($T2$) (i.e., $T1 \times T2$) is divided by a greatest common divisor of the first time interval and the second time interval (i.e., greatest common divisor of $T1$ and $T2$).

$$T0 = |(T1 \cdot T2)/(\gcd(T1, T2))| (\gcd = \text{greatest common divisor})$$

In this case, the delay time measuring unit calculates the delay time periods of a plurality of test packets received from the communication link in the fluctuating time interval ($T0$) in a manner that delay time periods are measured in a time period ($N$) of an arbitrary integer multiple of the fluctuating time interval (i.e., $T0 \times B$).

Preferably, the delay distribution generating unit obtains, as an occurrence frequency of delay distributions, a rate to the second time interval of elapsed time periods included in delay time period zones divided into a plurality of predetermined lengths from delay time periods of test packets corresponding to the elapsed time periods each from the instant of transmission of the burst load to the instant of transmission of the test packet.

Preferably, the load calculating unit obtains a network load L from the relation of $$D = \frac{a}{bL^2 + cL + d}$$

where

D denotes an occurrence frequency of the delay distributions, excepting both ends, obtained by the delay distribution generating unit; and a, b, c, and d denote respective constants.

In this case, the constants a, b, c, and d are given as:

$$a = -\frac{100 T_s}{T_a \cdot ft}$$

$$b = \frac{T_s^2}{ft^2}$$

$$c = \frac{T_s^2}{T_a \cdot ft} - \frac{2 T_s}{ft}$$

$$d = -\left(1 - \frac{T_s}{T_a}\right)$$

where ft denotes a frame time period (transmission time interval for the burst loads) [ms];

Ta denotes a time interval [ms] for the arrival of the burst load packets within the transmission time interval; and Ts denotes a packet processing time interval [ms].

According to another embodiment of the present invention, a network load detection method includes a test packet transmitting step of transmitting test packets to a to-be-measured communication link at a predetermined first time interval; a burst load transmitting step of transmitting burst loads each including a series of a plurality of load packets to the communication link at a predetermined second time interval different from the first time interval; a delay time measuring step of performing measurement of delay time periods in a manner that a plurality of test packets transmitted by varying elapsed time periods each from an instant of transmission of the burst load to an instant of transmission of the test packet are received from the communication link in a fluctuating time interval determined in accordance with the first and second time periods, and delay time periods corresponding to the elapsed time periods for the respective test packets are measured; a delay distribution generating step of generating delay distributions indicative of packet occurrence frequencies in relation to a delay time period of the communication link in accordance with the measured delay time periods; and a load calculating step of calculating a network load in accordance with occurrence frequencies in a specific section of the generated delay distributions.

According to another embodiment of the present invention, there is provided a network load detection apparatus for detecting a load on a communication link, wherein test packets are transmitted to the communication link at a predetermined first time interval, and burst loads each including a plurality of a series of load packets are transmitted to the communication link at a predetermined second time interval different from the first time interval. The apparatus includes a delay time measuring unit for performing measurement of delay time periods in a manner that a plurality of test packets transmitted by varying elapsed time periods each from an instant of transmission of the burst load to an instant of transmission of the test packet are received from the communication link in a fluctuating time interval determined in accordance with the first and second time periods, and delay time periods corresponding to the elapsed time periods for the respective test packets are measured; a delay distribution generating unit for generating delay distributions indicative of packet occurrence frequencies in relation to a delay time period of the communication link in accordance with the measured delay time periods; and a load calculating unit for calculating a network load in accordance with occurrence frequencies in a specific section of the generated delay distributions.

According to another embodiment of the present invention, there is provided a network load detection program stored on a computer-readable storage medium for a computer of a network load detection apparatus that operates to detect a load on a communication link, wherein test packets are transmitted to the communication link at a predetermined first time interval, and burst loads each including a plurality of a series of load packets are transmitted to the communication link at a predetermined second time interval different from the first time interval. The program includes a delay time measuring step of performing measurement of delay time periods in a manner that a plurality of test packets transmitted by varying elapsed time periods each from an instant of transmission of the burst load to an instant of transmission of the test packet are received from the communication link in a fluctuating time interval determined in accordance with the first and second time periods, and delay time periods corresponding to the elapsed time periods for the respective test packets are measured; a delay distribution generating step of generating delay distributions indicative of packet occurrence frequencies in relation to a delay time period of the communication link in accordance with the measured delay time periods; and a load calculating step of calculating a network load in accordance with occurrence frequencies in a specific section of the generated delay distributions.

According to the present invention, the test packets for the use of detecting the status of the network communication, and burst loads are periodically transmitted as testing loads to the communication load. The elapsed time periods each from the instant of the transmission of the burst load to the instant of the transmission of the test packet are varied, whereby the test packets and the burst loads are transmitted. Then, delay distributions are obtained from the delay time periods of the respective test packets corresponding to the elapsed time periods are obtained. Thereby, the network load on the in-operation communication link can be calculated from the amounts of the delay distributions excepting delay distribution on the both end sides by using the predetermined calculating expression.

More specifically, the burst loads are transmitted to the communication link, and packets are accumulated in buffers of router switches provided in the communication link, so that the delays of test packets are temporarily increased. Delay distributions are obtained utilizing the above-described phenomenon. Then, the occurrence frequency obtained from the delay distributions is assigned to the expression representing the relationship between the delay distributions and the network load, whereby the network load can be calculated.

As in past cases, when a network load desired to be measured is a constant load, that is, the packet transmission interval is fixed, the delay distribution of the test packets does not vary until the load reaches an overload level exceeding the 100% level, so that the communication status cannot be detected. However, according to the embodiment of the present invention, the burst loads are periodically transmitted as the testing loads to the communication link. Consequently, even with the loads lower than the 100% level, particularly, even with loads lower than the 50% level, the delay distributions of the test packets are varied, thereby making it possible to ensure the detection of the network load.

DETAILED DESCRIPTION OF THE EMBODIMENT

Figure 1:
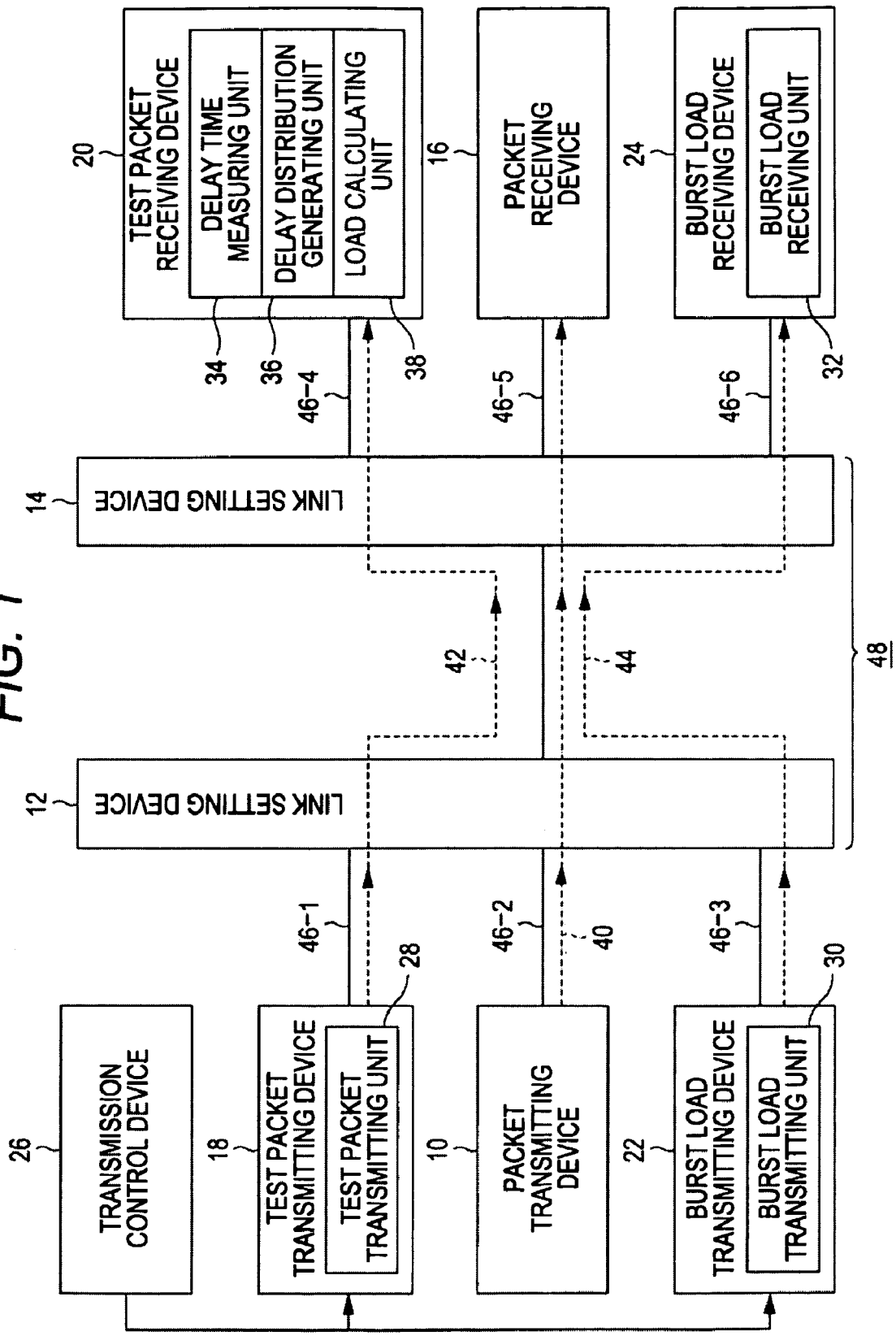
FIG. 1 is a block diagram showing an embodiment of a network load detection system in accordance with the present invention.

FIG. 1 is a block diagram showing an embodiment of a network load detection system in accordance with the present invention. With reference to FIG. 1, in the network load detection system, a detection target is a network load on a communication link 48 in a packet receiving device 16 (on a receiving side) connected from a packet transmitting device 10 (on a transmitting side) via the communication link 48 that includes link setting devices 12 and 14.

In order to detect the network load of the communication link 48, the configuration on the transmitting side includes a test packet transmitting device 18 and a burst load transmitting device 22. The test packet transmitting device 18, the packet transmitting device 10, and the burst load transmitting device 22, respectively, are connected to the link setting device 12 via local area networks (LANs) 46-1, 46-2, and 46-3. As each of the LANS 46-1 to 46-3, a 100 Mbps Ethernet (R) or the like is used.

The configuration includes a transmission control device 26 on the transmitting side. When a network load detection process according to the present embodiment is performed, the transmission control device 26 provides transmission synchronization. This synchronizes a test packet transmission initiation timing in a test packet transmitting unit 28 and a burst load transmission initiation timing in a burst load transmitting unit 30. The test packet transmitting unit 28 is provided in the test packet transmitting device 18, and the burst load transmitting unit 30 is provided in the burst load transmitting device 22.

The configuration includes a test packet receiving device 20 and a burst load receiving device 24 on the receiving side relative to the communication link 48. The test packet receiving device 20, a packet receiving device 16, and the burst load receiving device 24 are, respectively, connected to the link setting device 14 via LANs 46-4 to 46-6. As each of the LANs 46-4 to 46-6, a 100 Mbps Ethernet (R) or the like is used. As the communication link 48, a 10 Mbps Ethernet (R) or the like is used.

In the network load detection system of the present embodiment, test packets to be used for detection of the loaded status of the communication link 48 are each transmitted from the test packet transmitting unit 28, which is provided in the test packet transmitting device 18, to the communication link 48 at a predetermined time interval T1 (=19 ms, for example). The time interval T1 corresponds to a first time interval. In addition, burst loads to be used as testing loads are each transmitted from the burst load transmitting unit 30, which is provided in the burst load transmitting device 22, to the communication link 48 at a predetermined time interval T2 (=20 ms, for example). The time interval T2 corresponds to a second time interval. Thereby, the behavior of the respective test packet in the communication link 48 is varied.

Delay time periods (reception delay time periods) of the respective test packets passing or traveling through the communication link 48 are measured by a delay time measuring unit 34 provided in the test packet receiving device 20 on the receiving side. Then, delay distributions indicative of packet occurrence frequencies relative to delay time periods of the communication link (or, "communication link delay time periods", herebelow) are obtained by a delay distribution generating unit 36. Then, network loads L are calculated by a load calculating unit 38 according to a predetermined calculation expression (simply "expression", herebelow) in accordance with packet occurrence frequencies D that take constant values in the delay distributions, excepting both ends (i.e., excepting the respective delay distributions on both end sides) of the overall delay distributions.

More specifically, according to the present invention, burst loads 44 are transmitted to the communication link 48, and packets are accumulated in buffers of link switches in the link setting devices 12 and 14, so that the delays of test packets 42 are temporarily increased. Utilizing the phenomenon, a relationship of a to-be-measured load 40 with the network load L on the communication link 48 is calculated in accordance with a predetermined expression.

The above will be more specifically described hereinbelow. The test packet transmitting unit 28 transmits the test packets to the measurement target or to-be-measured communication link 48 at the first time interval corresponding to the time interval T1 (=19 ms). Concurrently, the burst load transmitting unit 30 transmits burst loads 44 formed of a plurality of juxtaposed test packets 42 to the communication link 48 at the second time interval set as the time interval T2 (=20 ms), which is different from the time interval T1 for the transmission of the test packets 42.

The delay time measuring unit 34, which is provided in the test packet receiving device 20, receives a plurality of test packets from the communication link 48 in a fluctuating time interval T0 determined in accordance with the test packet transmission time interval T1 and the burst load transmission time interval T2. Then, the delay time measuring unit 34 measures delay time periods corresponding to the elapsed time periods for the respective test packets. In this case, the plurality of test packets have been transmitted by serially varying the elapsed time period from the instant of transmission of the burst loads to the instant of reception of the test packet transmission.

The fluctuating time interval T0 is given according to Expression (1) shown below from the test packet transmission time interval T1 and the burst load transmission time interval T2.

$$T0=|(T1\times T2)/(\gcd(T1,T2))| \text{ (gcd=greatest common divisor)} \quad (1)$$

When the test packet transmission time interval T1=19 ms and the burst load transmission time interval T2=20 ms, the fluctuating time interval T0 is 380 ms.

In accordance with the delay time periods of the test packets measured by the delay time measuring unit 34, the delay distribution generating unit 36, which is provided in the test packet receiving device 20, generates delay distributions indicative of packet occurrence frequencies relative to the delay time periods of the communication link. From a delay distribution-network load theorem or relation, the load calculating unit 38 calculates network loads L in accordance with the occurrence frequency D corresponding to the generated delay distributions, excepting the respective delay distributions on both end sides of the overall delay distributions.

Figure 2:
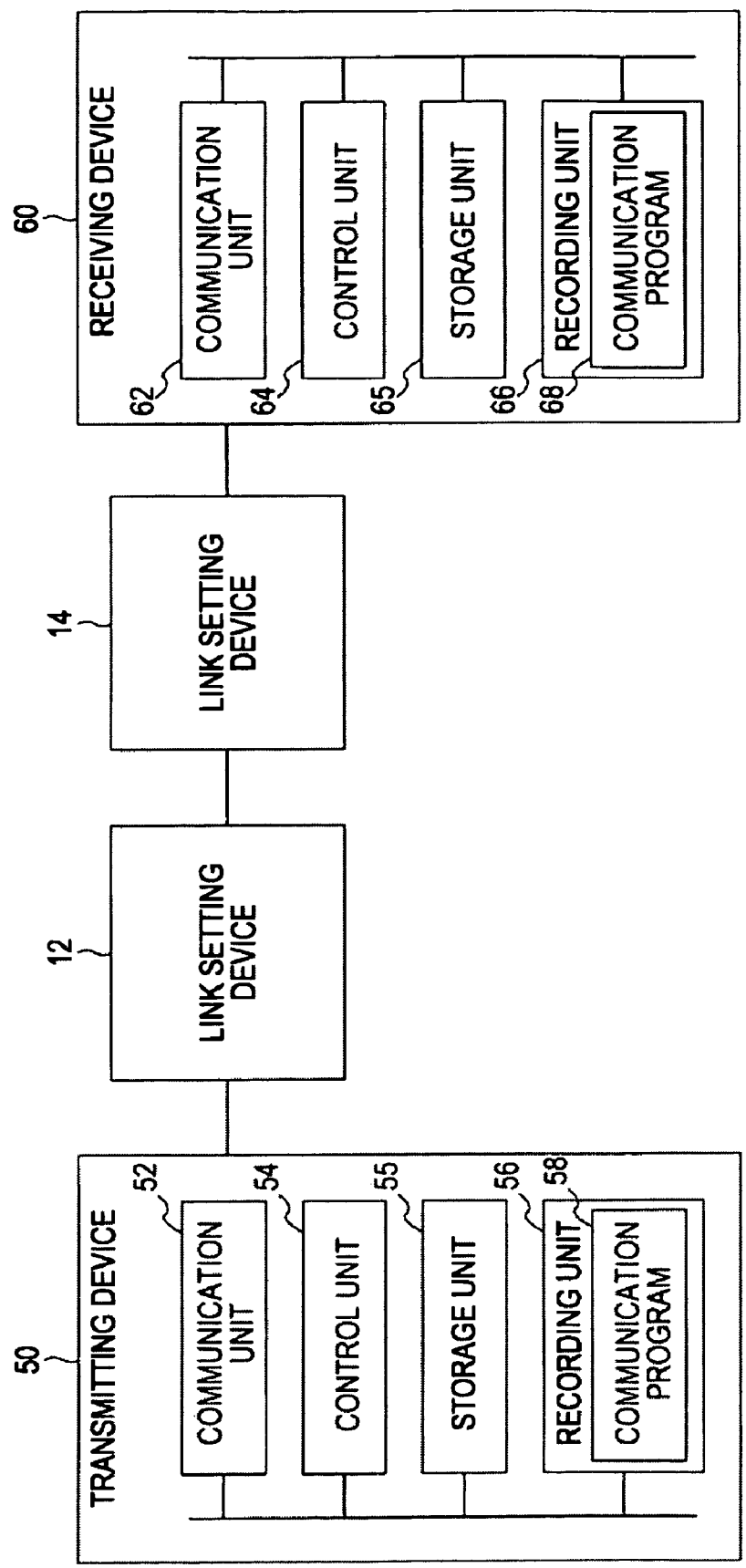
FIG. 2 is a block diagram showing hardware environments of computers to which the embodiment is applied.

FIG. 2 is a block diagram showing hardware environments of respective computers for use in a transmitting device 50 and receiving device 60 in an example employing the present embodiment. More specifically, FIG. 2 shows an example case in which the transmitting device 50 and the receiving device 60 are connected to the communication link 48 that includes the link setting devices 12 and 14.

The transmitting device 50 includes a communication unit 52, a control unit 54, a storage unit 55, and a recording unit 56. The control unit 54 is a central processing unit (CPU). A bus extending from the CPU connects to the communication unit 52, the storage unit 55, and the recording unit 56. The storage unit 55 is a random access memory (RAM). The recording unit 56 is realized by, for example, a read-only memory (ROM) or a hard disk drive (HDD). The recording unit 56 contains a communication program 58 in addition to an operating system (OS).

The receiving device 60 is basically or substantially the same as the transmitting device 50. More specifically, the receiving device 60 includes a communication unit 62, a control unit 64, a storage unit 65, and a recording unit 66. The control unit 64 is a CPU, and a bus extending from the CPU connects to the communication unit 62, the storage unit 65, and the recording unit 66. The storage unit 65 is a RAM. The recording unit 66 is realized by, for example, a ROM or an HDD, and contains a communication program 68 in addition to an OS.

The transmitting device 50 shown in FIG. 2 realizes or provides respective hardware environments of the packet transmitting device 10, the test packet transmitting device 18, and the burst load transmitting device 22 in the embodiment shown in FIG. 1. Similarly, the receiving device 60 shown in FIG. 2 realizes or provides respective hardware environments of the packet receiving device 16, the test packet receiving device 20, and the burst load receiving device 24 in the embodiment shown in FIG. 1.

According to the embodiment shown in FIG. 1, the respectively dedicated test packet transmitting device 18, test packet receiving device 20, burst load transmitting device 22, and burst load receiving device 24 are provided in the transmitting and receiving sides. Alternatively, however, as in the example shown in the block diagram of FIG. 2, the transmission control device 26, the test packet transmitting unit 28, and the burst load transmitting unit 30 may be provided in the same device as functions executable by the communication program 58 provided in the transmitting device 50.

Similarly, as functions realizable by execution of the communication program 68 provided in the receiving device 60 shown in FIG. 2, a burst load receiving unit 32, the delay time measuring unit 34, the delay distribution generating unit 36, and the load calculating unit 38, which are provided on the receiving side of the configuration shown in FIG. 1, may be provided in the single receiving device 60.

FIGS. 3A and 3C, respectively, are timing charts showing transmission timings of test packets and burst loads for executing the network load detection in the present embodiment. More specifically, according to FIG. 3A, which is the timing chart for test packets, with time t1 as an initiation point, 20 test packets 70-1 to 70-20 are transmitted to the communication link at the time interval T1 (=19 ms) for the fluctuating time interval T0 (=380 ms) obtained from Expression (1).

According to FIG. 3C, which is the timing chart for the burst loads, 19 burst loads 72-1 to 72-19 are transmitted to the communication link in synchronism with the test packet transmission timing having an initiation point of the time t1 at the time interval T2 (=20 ms) for the fluctuating time interval T0 (=380 ms).

The first burst load 72-1 is shown in an enlarged view below FIG. 3C. As shown in the enlarged view, 20 load packets 74-1 to 74-20, for example, are consecutively transmitted. In the case of the load packets 74-1 to 74-20, an arrival time interval for the arrival of the respective load packet is 0.02 ms (when calculated based on 100 Mbps), and a transmission time of one time transmission of burst loads is 0.4 ms.

According to the present embodiment, after transmission of burst loads, the test packets 70-1 to 70-20 are transmitted while elapsed time periods Tp (FIG. 3B) are each shifted by 1 ms within a range of from 0 ms to 19 ms. According to the relationship between the test packets shown in FIG. 3A and the burst loads shown in FIG. 3C, the test packet 70-1 and the burst load 72-1 are transmitted with the same timing at transmission initiation time t1. Thus, the elapsed time period Tp for the test packet 70-1 corresponding to the burst load 72-1 is 0 ms.

The timing at which the elapsed time periods Tp become 0 ms is a timing at which the number of packets (packet count) accumulated (or, "accumulated packet count") in the buffers of the link switch due to the burst loads becomes maximum. At this time, the test packet delay time period becomes maximum.

More strictly, in the above-described transmission with the same timing at the transmission initiation time t1, the test packet 70-1 is transmitted at the timing immediately after the transmission of the 20 load packets 74-1 to 74-20 extracted and shown in the enlarged view, corresponding to the burst load 72-1. Alternatively, it can be expressed such that the test packet 70-1 is transmitted as a 21st bursting packet.

For this reason, there is a time delay of 0.4 ms corresponding to the 20 load packets 74-1 to 74-20 being transmitted as the burst load 72-1 from the instant of initiating the transmission of the burst load 72-1 to the instant of initiating the transmission of the test packet 70-1.

For the subsequent test packet 70-2, the elapsed time periods Tp corresponding to the burst load 72-1 is 19 ms. For the subsequent test packet 70-3, the elapsed time period Tp corresponding to the burst load 72-2 is 18 ms. Similarly, for the respective remaining test packets 70-4 to 70-20, the elapsed time periods Tp are serially varied to 17 ms, 16 ms, 15 ms, . . . , and 1 ms corresponding to the respective burst loads 72-3 to 72-19.

The test packets corresponding to the burst loads are transmitted to the communication link in the manner that the elapsed time periods Tp for the test packets are serially varied in the range of from 0 ms to 19 ms. In this case, the number of accumulated test packets in the buffer of the link switch increases as the elapsed time periods are shorter, and the delay time periods of the test packets are reduced as the elapsed time periods are longer. Utilizing this phenomenon, the delay time periods corresponding to the elapsed time periods for the respective test packets are measured on the receiving side. Thereby, the delay distribution indicative of the packet occurrence frequency (%) relative to the communication link delay time period in the case that the burst loads are periodically to the to-be-measured normal load is obtained.

A manner of varying the behaviors of test packets by exerting burst loads on the measurement target or to-be-measured communication link in the present embodiment will be described hereinbelow.

Figure 4:
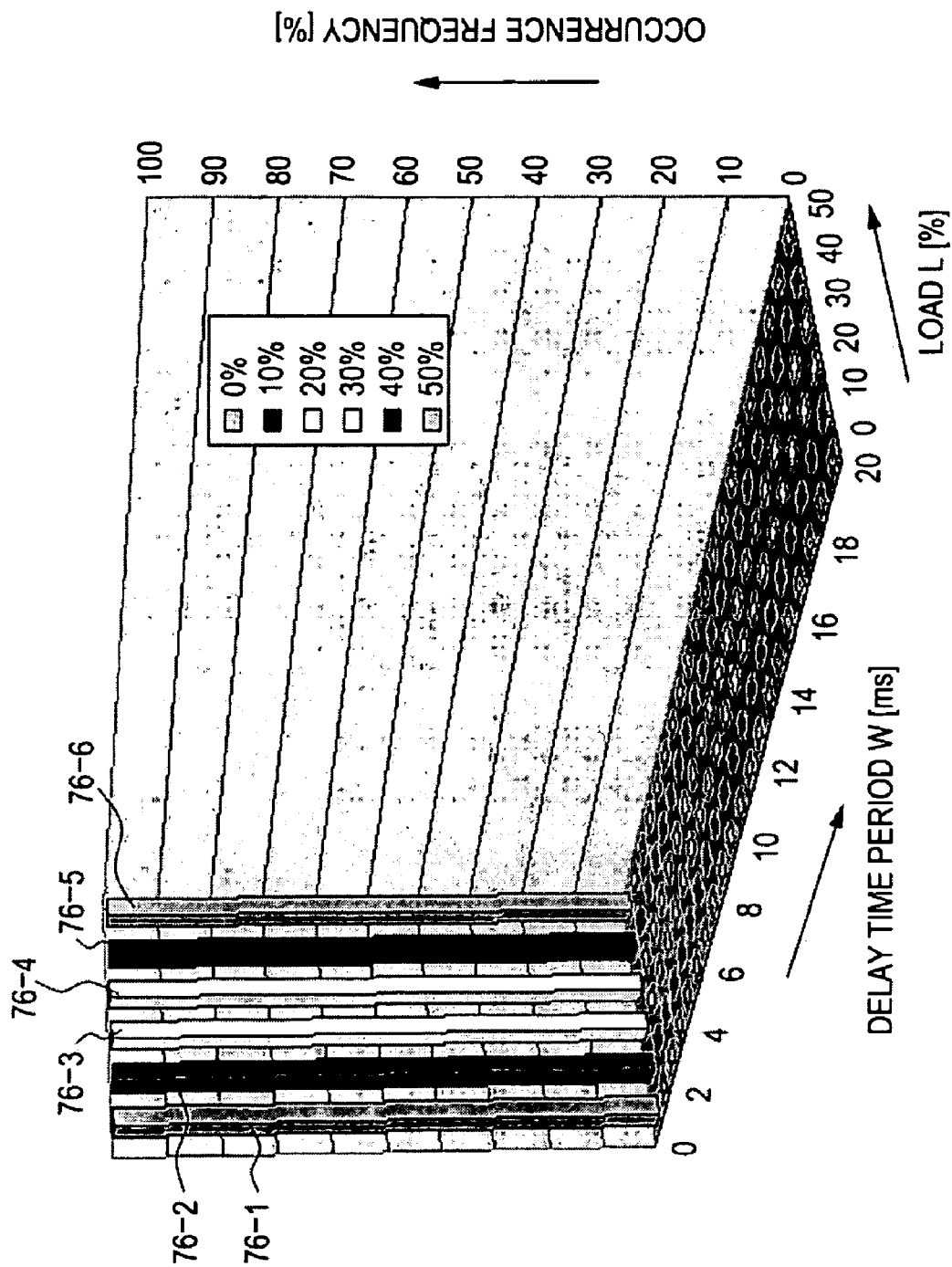
FIG. 4 is an explanatory view showing delay distributions in the event a normal load is varied.

FIG. 4 shows delay distributions of test packets transmitted at the time interval T1 of 19 ms in the event of only the normal load, in which the normal load is varied to 0%, 10%, 20%, 30%, 40%, and 50%. Delay distributions are shown in FIG. 4 such that the horizontal axis represents the delay time period, in which the time period of 20 ms is divided in units of 1 ms, and the vertical axis represents the packet occurrence frequency (%) indicative of the number of accumulated packets in the buffers.

Thus, in the case of only the normal load, according to the delay distributions of test packets in the event that the normal load is varied to 0%, 10%, 20%, 30%, 40%, and 50%, the delays are all distributed to segments each corresponding to the delay time period of 0 ms (in the time interval from 0 to 1 ms) as delay distributions 76-1 to 76-6. However, the delay distributions do not vary.

Figure 5:
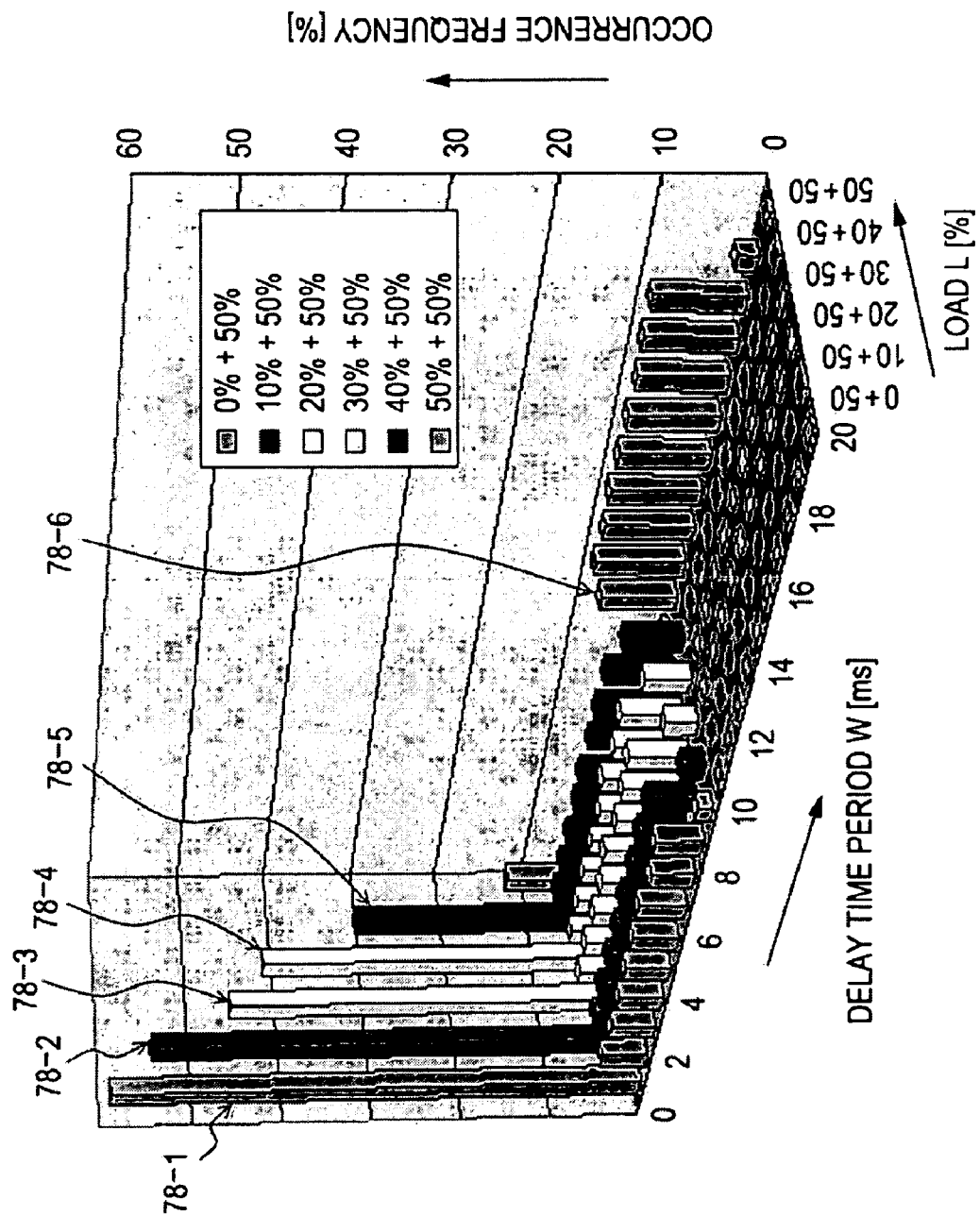
FIG. 5 is an explanatory view showing delay distributions in the event burst loads are added to the normal loads in the embodiment.

FIG. 5 shows delay distributions of test packets in the event that a 50% burst load is exerted at the time interval T of 20 ms in addition to the normal load. In this case, the normal load is varied to six stages from 0 to 50%, whereby delay distributions 78-1 to 78-6 are obtained.

As in the present embodiment, in the case that the 50% burst load is added to the normal load, even in the delay distribution 78-1 in which the normal load is 0%, a variation in the delay distributions of test packets is obtained in units of the respective segment corresponding to 1 ms over the range of from 0 to 10 ms. In addition, as indicated in the delay distributions 78-2 to 78-5, as the load is increased to 10%, 20%, 30%, and 40%, while the occurrence frequency in the first segment of the delay distributions, that is, the segment corresponding to the time interval from 0 to 1 ms, is reduced, the occurrence frequencies in central segments are increased in association with increases in the load.

Further, according to the delay distribution 78-6 of a 100% load formed of a 50% normal load relative to a 50% burst load, delay time periods of test packets are widely distributed over a range of from about 0 to about 20 ms.

Figure 6:
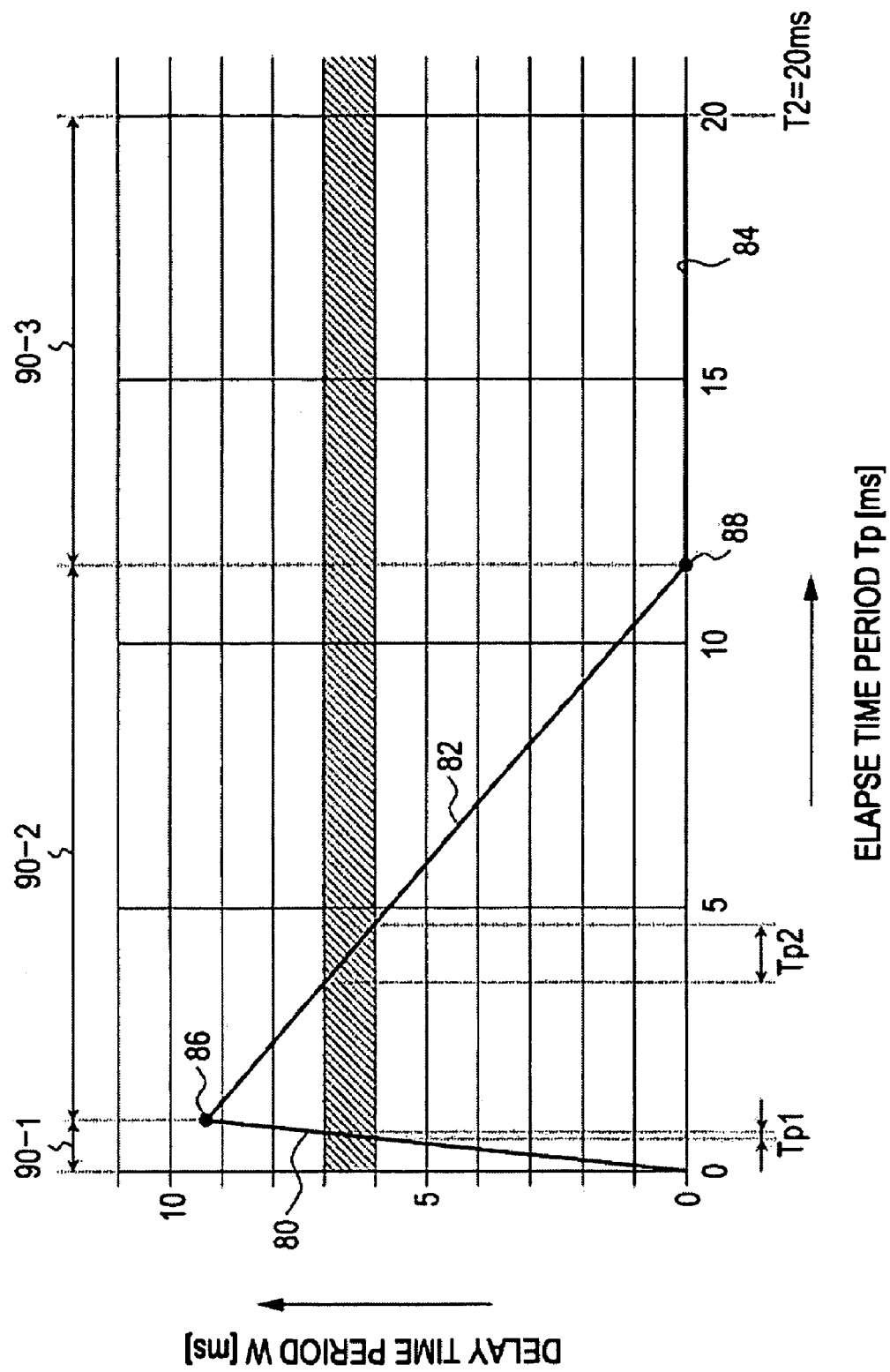
FIG. 6 is a graph showing the relationship of delay time periods to elapsed time periods in the event the burst loads pass through buffers of a link setting device.

FIG. 6 is a graph showing the relationship of the delay time period with an elapsed time period in the event that the burst load passes through the buffers of the link setting device in the present embodiment. In this case, the graph is shown with reference to an example in which the burst load is set to 50%, and the normal load is set to 10%.

Upon arrival of a burst load formed of a group of packets, the packets exhibit behavior such that the packets momentarily accumulate in the buffers of the link switch and are removed from the buffers as they are being processed over the time. The behavior of such packets can be represented in a graph of FIG. 6.

With reference to FIG. 6, the horizontal axis represents an elapsed time period Tp from the instant of arrival of a plurality of packets at the buffers to the instant of removal of the packets from the buffers. In the present embodiment, the burst load arrives at the time interval T2 (=20 ms).

In the event of arrival of a burst load at the buffers corresponding to an elapsed time period Tp of 0 ms, the number of packets in the buffers is sharply increased, and as represented by a characteristic 80, a delay time period W is sharply increased from 0 ms to a peak point 86.

When having reached the peak point 86, the delay time period linearly reduces, as represented by a characteristic 82, in association with the transmission process of packets accumulated in the buffers and reduction in the number of buffers, and then reaches a transfer completion point 88. Thereafter, since no packets exist in the buffers, the delay time period W becomes 0 ms, as represented by a characteristic 84.

Figure 7:
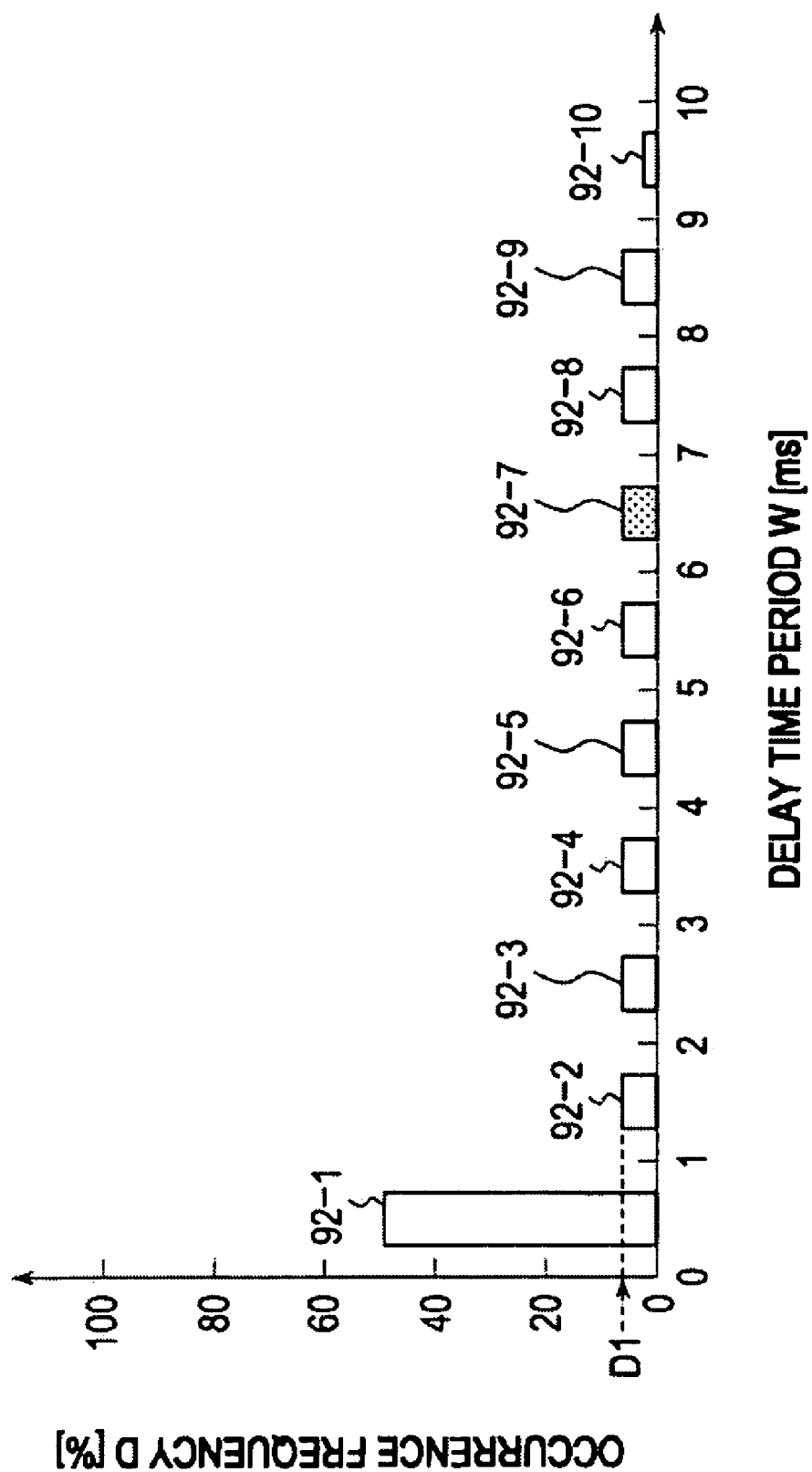
FIG. 7 is an explanatory view showing delay distributions due to burst loads obtained from the graph of FIG. 6.

FIG. 7 is a histogram showing delay distributions due to the burst loads obtained from the graph of FIG. 6. In FIG. 7, the delay time period W on the horizontal axis is divided by, for example, a time interval of 1 ms, and packet occurrence frequencies D (%) indicative of the respective numbers of packets remaining in the buffers in the respective time intervals are shown.

For example, the following describes with reference to an example case in which a packet occurrence frequency D is obtained for a time interval corresponding to 6 ms$\leq$W$\leq$7 ms shown in a hatched portion of FIG. 6.

An elapsed time period corresponding to the characteristic 80 falling in the time interval (hatched portion) of the delay time is Tp1, and an elapsed time period corresponding to the represented by the characteristic 82 is Tp2. As such, in this case, the packet occurrence frequency D in the delay distribution can be obtained as $$D = (Tp1 + Tp2)/T2 (\%).$$

This represents a delay distribution 92-7 corresponding to a delay time period from 6 to 7 ms in FIG. 7.

Similarly, when packet occurrence frequencies D are obtained for the respective 1-ms time intervals corresponding to the delay time periods W in the range of from 0 to 10 by reference to FIG. 6, delay distributions 92-1 to 92-10 shown in FIG. 7 are derived.

As is apparent from FIG. 6, the delay distribution 92-1 in the time interval from 0 to 1 ms of the delay time periods W shown in FIG. 7 is shown to be highest since it is indicated by the percentage rate to the time interval T2 (=20 ms) of the elapsed time period corresponding to a characteristic 84 in which W=0.

Further, the delay distribution 92-10 is shown to be lowest since the portion thereof corresponds to an elapsed time period corresponding to the delay time period W from 9 to 10 ms including the characteristic 86 shown in FIG. 6.

The central delay distributions 92-2 to 92-9, excepting the delay distributions 92-1 and 92-10 on both end sides, are represented by values respectively obtained for both the characteristic 80 and characteristic 82 in the manner that the elapsed time periods corresponding to the delay time periods in the respective time intervals are summed, and the sum is divided by T2 (=20 ms). As is apparent from FIG. 7, all the delay distributions 92-2 to 92-9 have the same, constant height D1.

The graph of FIG. 6 can be represented by Expression (2) below.

$$W = \left(\frac{P_c}{ft}t + \frac{1}{T_a}t - \frac{1}{T_s}t\right) \times T_s \qquad (2)$$

where, w denotes a delay time period [ms];

t denotes an elapsed time period [ms];

Pb denotes the number of burst load packets (pieces) to be transmitted in 20 ms;

Pc denotes the number of normal packets (pieces) to be transmitted in 20 ms;

ft denotes a frame time period (transmission time interval for burst loads) [ms];

Ta denotes a time interval for the arrival of burst load packets within an I transmission time interval [ms]; and Ts denotes a one-packet processing time interval (ms).

Expression (2) has the following contents:

(Delay time period $W$)={(arriving normal packet number $Pc$)+(arriving burst load packet number $Pb$)−(to-be-processed packet number)}×(one-packet processing time interval $Ts$)=(in-buffer packet number)×(one-packet processing time interval $Ts$)

The delay time period W given by Expression (2) can be represented as a segmentation function used for division (segmentation) into three time intervals, namely, time intervals 90-1 to 90-3 in the case of FIG. 6.

First, the delay time period W for the characteristic 80 corresponding to the time interval 90-1 from the zero point to the characteristic 86 is given by Expression (3) below.

For the time interval represented by $0 \leq t \leq T_a P_b$ $$W = \left(\frac{T_s}{ft}P_c + \frac{T_s}{T_a} - 1\right) \times t \qquad (3)$$

The delay time period W for the characteristic 82 corresponding to the time interval 90-2 from the peak point 86 to the transfer completion point 88 is given by Expression (4) below.

For the time interval represented by $$T_a P_b \leq t \leq \frac{ft \cdot T_s P_b}{T_s P_c - ft} \quad W = \left(\frac{P_c}{ft}t + \frac{1}{T_a}t - \frac{1}{T_s}t\right) \times T_s$$

t=T$_a$P$_b$ is assigned as:

$$W = \left(\frac{P_c}{ft}t + \frac{1}{T_a} \times T_a P_b - \frac{1}{T_s}t\right) \times T_s = \left(\frac{T_s P_c}{ft} - 1\right)t + T_s P_b \qquad (4)$$

Further, the delay time period W for the remaining time interval 90-3 corresponding to the characteristic 84 is given by Expression (5).

For the time interval represented by $$\frac{ft \cdot T_s P_b}{T_s P_c - ft} \leq t \leq ft \qquad (5)$$

$$W = 0$$

Further, a maximum value Wmax of the delay time period corresponding to the peak point 86 is given by Expression (6) below.

$$W\max = \left(\frac{T_s}{ft}P_c + \frac{T_s}{T_a}t - 1\right) \times T_a P_b \qquad (6)$$

In the case that the expression of the delay time period W when the burst load has arrived at the buffers, even when the normal load has varied, delay distributions can be obtained in a similar manner through calculation.

Figure 8:
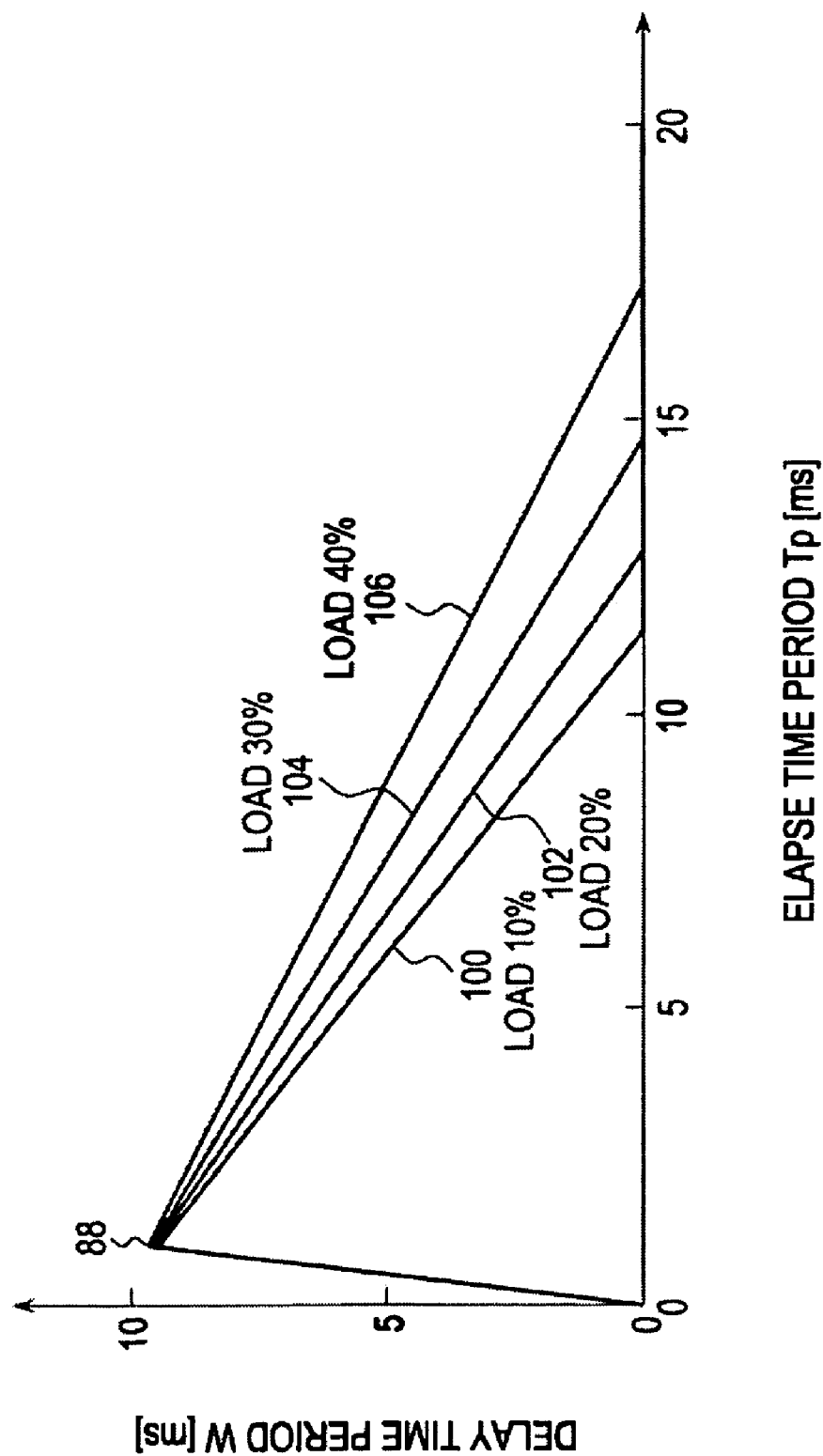
FIG. 8 is a graph showing variations in the normal load corresponding to the relationship of delay time periods to elapsed time periods in the event burst loads pass through the buffers of the link setting device.

FIG. 8 is a graph showing delay time periods W relative elapsed time periods Tp after arrival of burst loads in the event that the normal load has varied to 10%, 20%, 30%, and 40%.

Similarly as in the case shown in FIG. 6, in the case of a 10% load, a characteristic reduces after the burst load has reached the peak point 86 is represented as a characteristic 100. In the case of a 20% load, the characteristic is represented as a characteristic 102. Further, in the case of a 30% load, the characteristic is represented as a characteristic 104. This indicates that the elapsed time period in which packets are removed from the buffers is increased as the load is increased.

Figure 9:
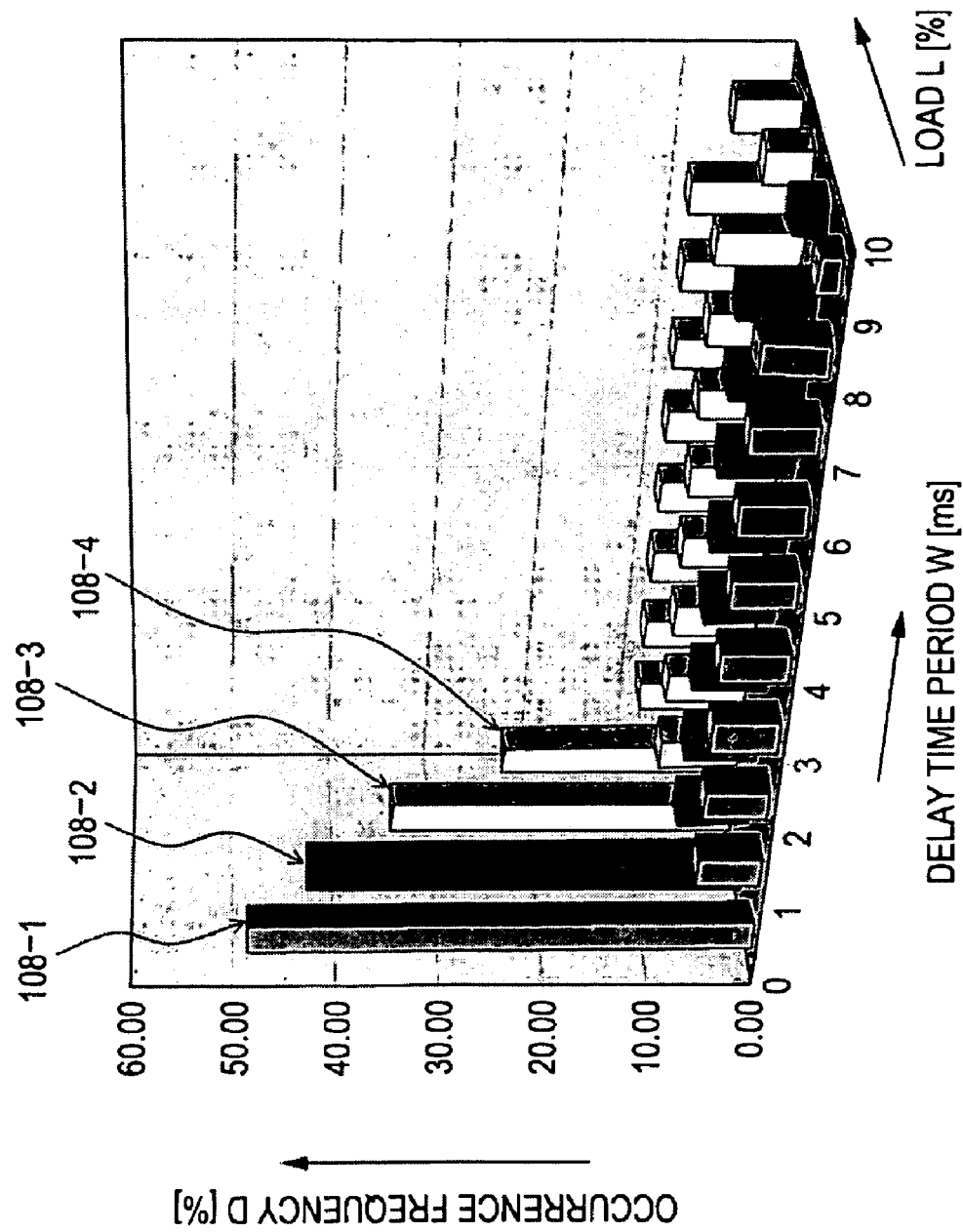
FIG. 9 is an explanatory view showing delay distributions due to burst loads in relation to variations in the normal load obtained from the graph of FIG. 8.

FIG. 9 is an explanatory view showing delay distributions due to burst loads in relation to variations in the normal load obtained from the graph of FIG. 8. In FIG. 9, a delay distribution 108-1 occurs in the case of a 10% normal load, a delay distribution 108-2 occurs in the case of a 20% normal load, a delay distribution 108-3 occurs in the case of a 30% normal load, and a delay distribution 108-4 occurs in the case of a 40% normal load.

As is apparent from the delay distribution, when the burst load is fixedly added at a predetermined time interval, the delay distribution varies as the normal load increases. Particularly, there is clearly shown the state in which a portion having a predetermined height of the delay distributions, excepting the delay distributions on both end sides in the overall delay distributions, serially increase as the load increases.

According to the present embodiment, variations in delay distributions are thus obtained by fixedly adding burst loads to normal loads at the fixed (predetermined) time interval. When the variations are successfully obtained, the network load on the detection target or to-be-detected communication link can be calculated using an expression in accordance with the delay distributions.

In the load calculating unit 38, which is provided in the test packet receiving device 20 of the present embodiment shown in FIG. 1, the load on the detection target is calculated from relations of Expression (7) below.

$$D = \frac{a}{bL^2 + cL + d} \quad (7)$$

where,
D denotes a rate of the delay time periods of the test packets to a unit time period; and
L denotes a load on the measurement target.

The respective constants a, b, c, and d in Expression (7) are given by expressions shown below.

$$a = -\frac{100 T_s}{T_a \cdot ft}$$

$$b = \frac{T_s^2}{ft^2}$$

$$c = \frac{T_s^2}{T_a \cdot ft} - \frac{2T_s}{ft}$$

$$d = -\left(1 - \frac{T_s}{T_a}\right)$$

where,
ft denotes a frame time period (transmission time interval for burst loads) [ms];
Ta denotes a time interval [ms] for the arrival of the burst load packets within the transmission time interval; and
Ts denotes a packet processing time interval [ms].

Derivation of Expression (7) is described herebelow.

$$D = \frac{\frac{1}{\frac{T_s}{ft}L + \frac{T_s}{T_a} - 1} - \frac{1}{\frac{T_s}{ft}L - 1}}{ft} \times 100$$

$$= \frac{\left(\frac{T_s}{ft}L - 1\right) - \left(\frac{T_s}{ft}L + \frac{T_s}{T_a} - 1\right)}{\left(\frac{T_s}{ft}L + \frac{T_s}{T_a} - 1\right)\left(\frac{T_s}{ft}L - 1\right)} \times \frac{100}{ft}$$

$$= \frac{\frac{T_s}{ft}L - 1 - \frac{T_s}{ft}L - \frac{T_s}{T_a} + 1}{\frac{T_s}{ft} \cdot \frac{T_s}{ft}L^2 + \left(\frac{T_s^2}{T_a \cdot ft} - \frac{T_s}{ft} - \frac{T_s}{ft}\right)L - \frac{T_s}{T_a} - 1} \times \frac{100}{ft}$$

$$= \frac{-\frac{T_s}{T_a}}{\frac{T_s}{ft} \cdot \frac{T_s}{ft}L^2 + \left(\frac{T_s^2}{T_a \cdot f} - \frac{T_s}{ft} - \frac{T_s}{ft}\right)L - \left(1 - \frac{T_s}{T_a}\right)} \times \frac{100}{ft}$$

$$= \frac{-\frac{T_s}{T_a} \times \frac{100}{ft}}{\frac{T_s^2}{f^2t}L^2 + \left(\frac{T_s^2}{T_a \cdot f} - \frac{2T_s}{ft}\right)L - \left(1 - \frac{T_s}{T_a}\right)}$$

$$= \frac{a}{bL^2 + cL + d}$$

where,
ft denotes a frame time period (transmission time interval for the burst loads) [ms];
Ta denotes a time interval [ms] for the arrival of the burst load packets within the transmission time interval; and
Ts denotes a packet processing time interval [ms].

Figure 10:
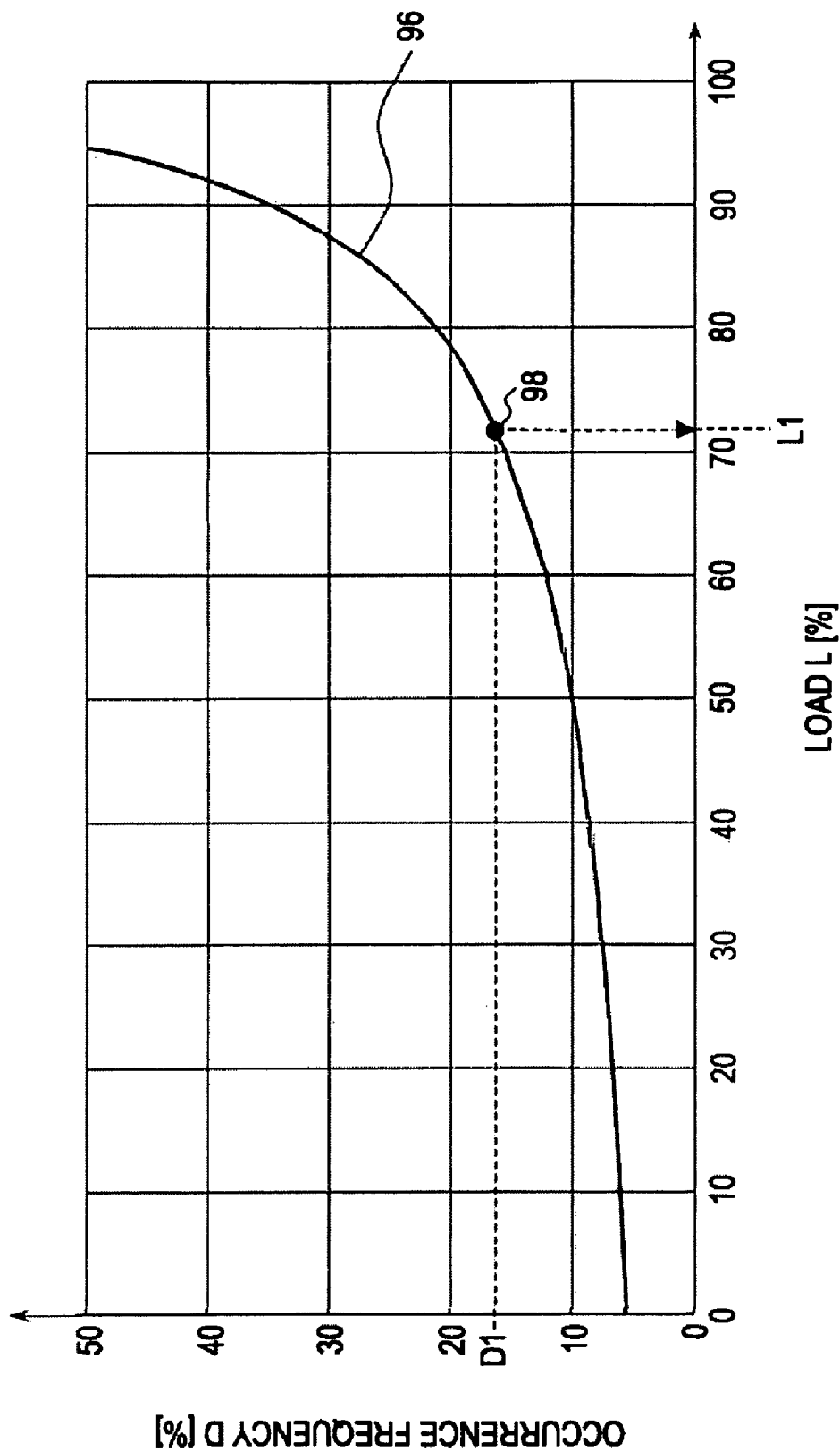
FIG. 10 is a graph showing the relationship between an occurrence frequency and a load in delay distributions in the embodiment.

The relationship of the packet occurrence frequencies D with network loads L in Expression (7) is represented by a characteristic 96 shown in FIG. 10. For the expression-derived characteristic 96, Expression (7) is used to obtain a load L1 that is given from a point of intersection 98 with an occurrence frequency D1, which is obtained from the delay distributions, corresponding to the height of a central portion of the delay distributions, excepting the delay distributions on both ends.

According to the present embodiment, the characteristic shown in FIG. 6 and indicative of the behavior of the burst loads in the buffers is used to obtain the load L. More specifically, as shown in the timing chart of FIG. 3, the test packets are transmitted to the to-be-tested communication link at the time interval T1 (=19 ms), and synchronously, the burst loads are transmitted to the communication link at the time interval T2 (=20 ms). (Strictly speaking, the test packets are transmitted immediately after the transmission of the burst loads). The test packets thus transmitted are received, and delay time periods thereof are measured. Thereby, the characteristic of the delay time periods W in relation to the elapsed time periods Tp is measured, whereby, as shown in FIG. 6, the characteristic of the elapsed time periods Tp to the delay time periods W is measured. In accordance with the results of the above, the delay distributions shown in FIG. 7 are obtained, and finally, the load L is obtained by assigning to the Expression (7) the occurrence frequency corresponding to the height of the central delay distribution, excepting delay distribution on both end sides.

Figure 11:
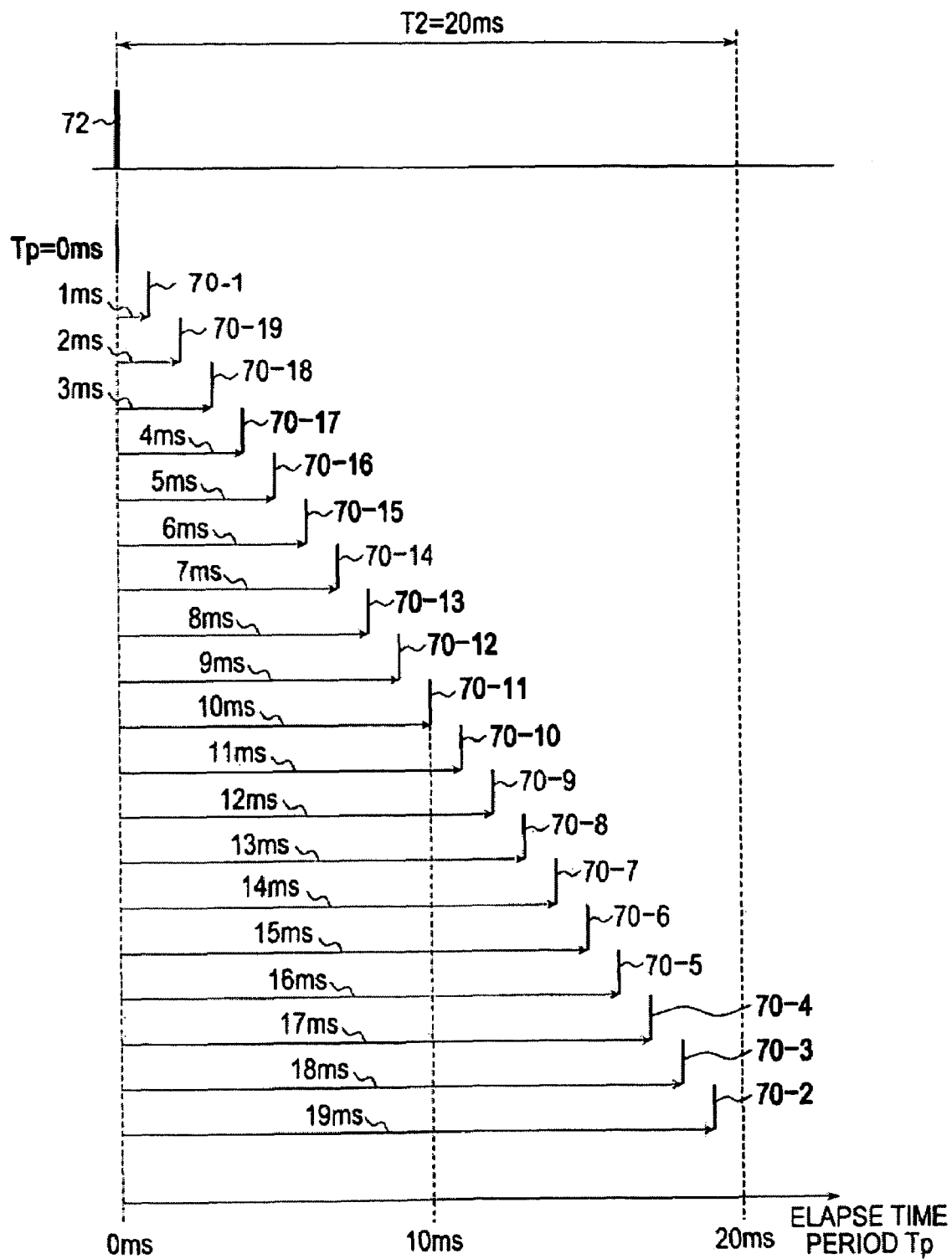
FIG. 11 is an explanatory view showing the relationship of elapsed time periods until the test packets corresponding to the burst loads are transmitted in the embodiment.

FIG. 11 is an explanatory view showing the relationship of an elapsed time period until the test packets corresponding to the burst loads are transmitted in the embodiment.

With reference to FIG. 11, burst loads 72 are transmitted at the time interval T2 (=20 ms), as shown in FIG. 3C. More specifically, the first transmission timings are synchronized, and as shown in FIG. 3A, the test packets are transmitted at the time interval T1 (=19 ms), which is about 1 ms shorter than the time interval T2 (=20 ms). More strictly, the test packets are transmitted 0.4 ms after the transmission of the burst loads.

As a consequence, FIG. 11 collectively shows the elapsed time periods until the respective test packets 70-1 to 70-20 after, as initiation point, the transmission of the burst loads 72-1 to 72-19 of FIG. 3C are collectively shown in a same time zone. More specifically, the elapsed time periods TP until the transmission of the test packets 70-2 to 70-19 from the transmission of the burst loads 72 are listed sequentially from 0 ms to 19 ms, as shown in FIG. 11.

Consequently, the test packets and burst loads shown in FIGS. 3A to 3C are transmitted through the same transmission operation as in the manner that 20 test packets are transmitted by shifting the respective elapsed time periods by 1 ms in relation to the burst loads 72 shown in FIG. 11.

The test packets are thus transmitted by varying the elapsed time periods after the burst loads are transmitted. Thereby, the behaviors of the buffers of the link switch in the elapsed time periods shown in FIG. 7 can be detected by the test packets.

Thus, the test packets 70-1 to 70-19 respectively corresponding to the elapsed time periods after the transmission of the burst loads 72 shown in FIG. 11 are transmitted. Then, the test packets obtained from the communication link during the transmission are processed by the delay time measuring unit 34 of the test packet receiving device 20 shown in FIG. 11. Thereby, measurement points P1 to P19 having the delay time periods W corresponding to the respective elapsed time periods Tp shown in FIG. 12 can be obtained.

Figure 12:
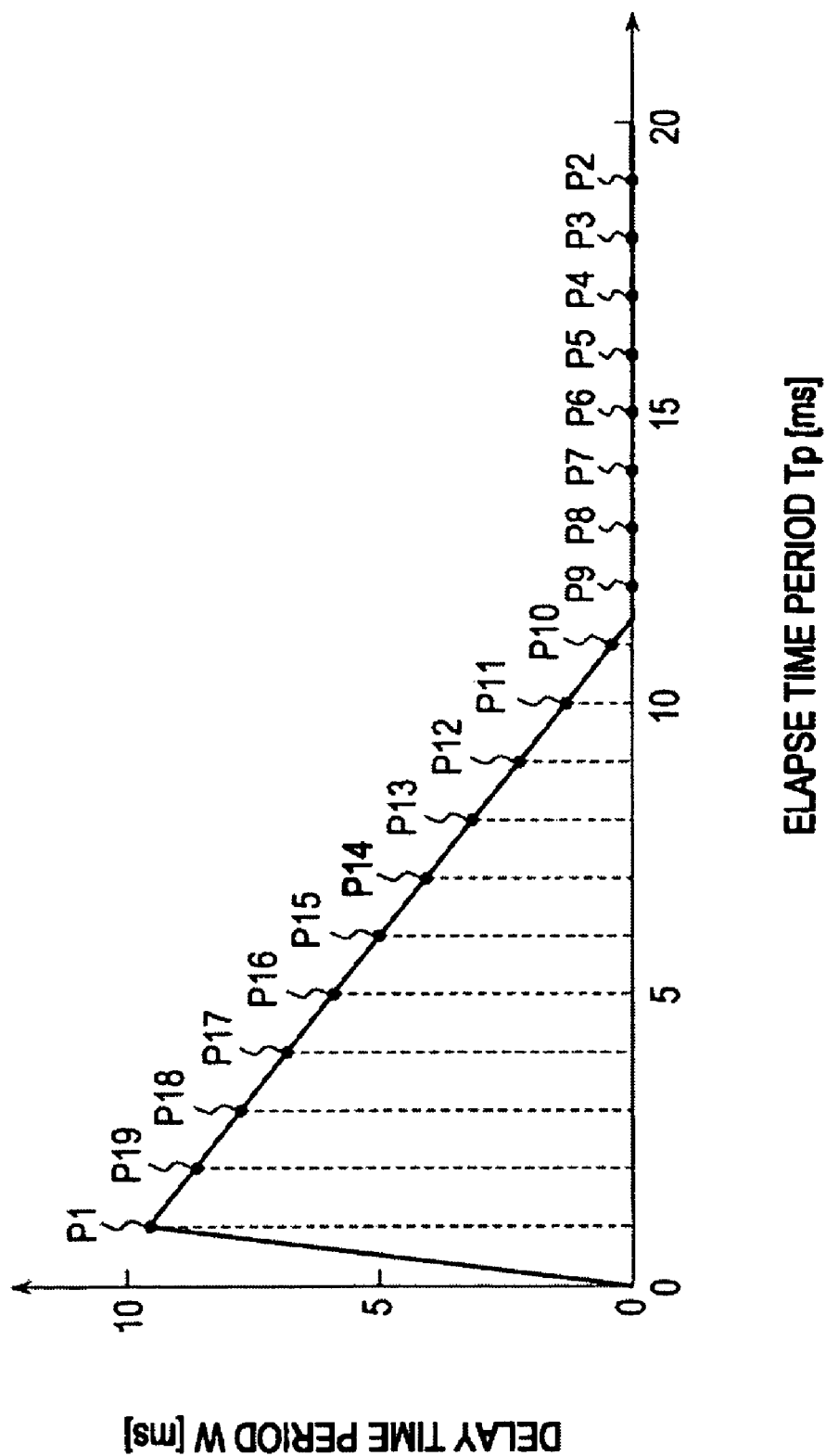
FIG. 12 is a graph showing delay time periods measured upon reception of the test packets transmitted at different elapsed time periods after the transmission of burst loads in the embodiment.

In FIG. 12, the measurement point P1 corresponds to the elapsed time period Tp (=0 ms), so that there are plural packets corresponding to burst loads, and the delay time period W reaches the maximum value Wmax. Regarding the test packet 70-2, the elapsed time periods Tp reaches the maximum of 19 ms. In this case, packets in the buffers are all sent out, that is, no packets remain therein, so that the delay time period W is 0 ms.

The subsequent measurement points P2 to P9 correspond to the test packets 70-2 to 70-9, and the delay time periods W in this case are 0 ms.

The measurement point P10 is obtained by the test packet 70-10, from the test packet 70-10, and the elapsed time period Tp corresponding thereto is 11 ms. This indicates that the delay time period W starts increasing. The measurement point P10 to P1, respectively, correspond to the test packets 70-10 to 70-1. In this case, the number of packets in the buffers increases corresponding to the reduction in the elapsed time period Tp, and also the delay time period W is linearly increased.

Thus, the relationship of the delay time periods W with the elapsed time periods Tp, as described in FIG. 12, or more specifically, the behavior due to the burst loads in the buffers provided in the link switch in the communication link, is measured upon reception of the test packets. When the measurement result is successfully obtained, then delay distributions, such as shown in FIG. 7, are obtained from the characteristic as shown in FIG. 12. Then, the packet occurrence frequency D corresponding to the height of the central delay distributions 92-2 to 92-9, excepting the respective delay distributions 92-1 and 92-10 on both end sides, is obtained, and then is applied to Expression (7). Thereby, the load L in the above-described event can be obtained.

In the above-described case, it is preferable that an average value be calculated for the packet occurrence frequency D that corresponds to the height of the central delay distributions, excepting the delay distributions on both end sides and that is obtained from the characteristic shown in FIG. 12.

Figure 13:
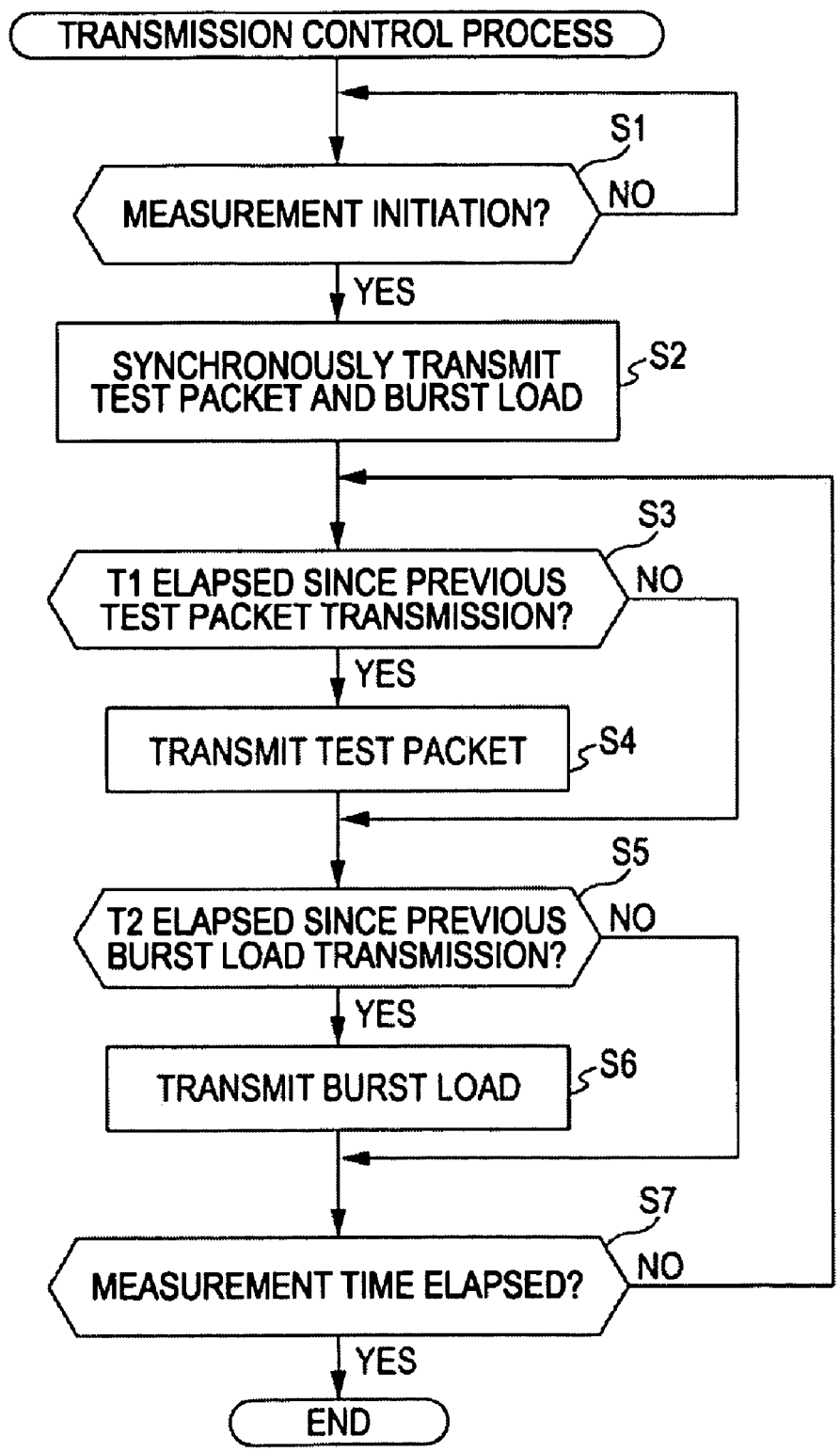
FIG. 13 is a flow chart showing a transmission control process in the embodiment.

FIG. 13 is a flow chart showing a transmission control process in the present embodiment. The control process is performed through operations in the hardware environments shown in FIG. 1. More specifically, the series of operations of the control process is performed by the test packet transmitting unit 28 and burst load transmitting unit 30 in the respective test packet transmitting device 18 and burst load transmitting device 22 in response to commands or specifications issued from the transmission control device 26 shown in FIG. 1.

With reference to FIG. 13, the transmission control process (or, simply "process", hereinbelow) is performed as follows. To begin with, at step S1, the process determines the presence or absence of a specification for transmission initiation. Upon receipt of a specification for the transmission initiation through, for example, a specifying operation of an operator, the process proceeds to step S2. At step S2, transmission of a test packet and transmission of a burst load to the communication link 48 are synchronously initiated in response to a synchronous transmission specification issued to the test packet transmitting unit 28 and the burst load transmitting unit 30.

Subsequently, at step S3, the process determines whether or not the time interval T1 (=19 ms) elapsed since previous transmission of a test packet. If it is determined that the time period of 19 ms elapsed, then the process proceeds to step S4. At step S4, a subsequent test packet is transmitted to the communication link 48.

Subsequently, at step S5, it is determined whether or not the time interval T2 (=20 ms) elapsed since previous transmission of a burst load. If it is determined that the time period T2 of 20 ms elapsed, then the process proceeds to step S6. At step S6, the burst load is transmitted to the communication link 48.

The test packet transmission at the time interval T1 and the burst load transmission at the time period T2 at steps S3 to S6 are iterated until a predetermined measurement time of, for example, one minute elapses. At step S7, it is determined whether or not the predetermined measurement time elapsed. If the measurement time elapsed, then the series of operations of the transmission control process terminates.

Figure 14:
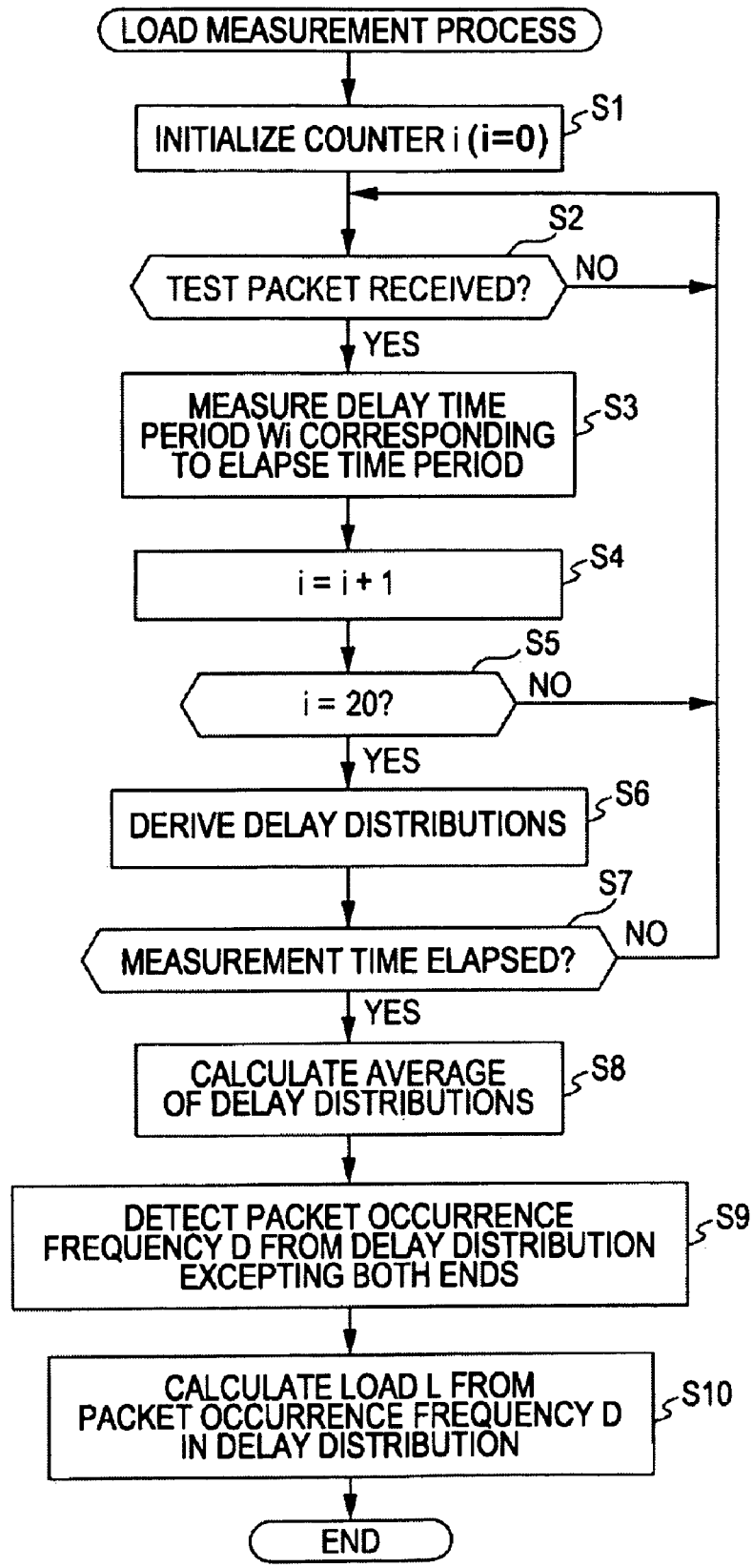
FIG. 14 is a flow chart showing a load measurement process in the embodiment.

FIG. 14 is a flow chart showing a load measurement process in the embodiment. The load measurement process is performed through operations of the delay time measuring unit 34, delay distribution generating unit 36, and load calculating unit 38 of the test packet receiving device 20 shown in FIG. 1.

With reference to FIG. 14, in the load measurement process (or, simply "process", herebelow), at step S1, a counter i is initialized to 0 (i=0). Then, at step S2, it is determined whether or not a test packet has been received. If it is determined that a test packet has been received, then the process proceeds to step S3. At step S3, a delay time period Wi of the communication link 48 is measured from a parameter indicative of transmission time and reception time included in a header of the test packet, and the result is retained or stored.

Subsequently, at step S4, the counter i is incremented by one. Then, at step S5, it is determined whether or not the counter i has reached a threshold value (=20) indicative of the number of received test packets at the fluctuating time interval T0. If the counter i is less than the threshold value (=20), then the process returns to step S2, and a subsequent test packet is iteratively received.

If at step S5 it is determined that the number of received test packets has reached the threshold value (=20), then the process recognizes completion of reception of all test packets in the fluctuating time interval T0. Then, the process proceeds to step S6. At step S6, a delay distribution such as shown in FIG. 7 is derived from the relationship of delay time periods W1 to W20 with the elapsed time periods Tp (=0 to 19 ms), that is, from the graph of FIG. 12.

Subsequently, at step S7, it is determined whether or not a preliminarily set measurement time of, for example, one minute, elapsed. If the elapsed time period is less than one minute, then the process returns to step S2. Thereby, delay time periods based on reception of subsequent test packets in the fluctuating time interval T0 are measured, and then delay distributions are obtained. In the measurement time of one minute, at least delay distributions can be measured at least 15 times.

Subsequently, the process proceeds to step S8. At step S8, an average value of, for example, 15 times of delay distributions obtained in the measurement time of one minute is obtained. By the average value calculation to obtain the plurality of delay distributions, abnormal values due to noise or the like in the respective measurement operations are absorbed. Consequently, the measurement results of the delay distributions can be stably obtained.

Subsequently, at step S9, the occurrence frequency D corresponding to the height of the delay distributions, excepting both ends of the delay distributions, obtained through the average value calculation is detected. Even in this case, the packet occurrence frequency D is calculated as the average value of the heights of the delay distributions, excepting the delay distributions on both end sides.

Subsequently, at step S10, the load L on the to-be-measured communication link 48 is calculated by use of the packet occurrence frequency D, which has been obtained from the delay distribution, in Expression (7). Then, the series of operations of the load measurement process terminates.

The present invention further provides a program for the delay time measuring unit 34, the delay distribution generating unit 36, and the load calculating unit 38, which are provided in the test packet receiving device 20 shown in FIG. 1. The program has the contents shown in the flow chart of the load measurement process shown in FIG. 14.

The present invention further provides a computer-readable recording medium containing the contents of the load measurement process shown in FIG. 14. The recording medium includes, but is not limited to, any one of not only a CD-ROM (compact disk-read only memory), floppy disk (R), DVD (digital versatile disk), magneto-optic disk, portable recording medium such as an IC card disk, storage medium such as a hard disk drive provided in the inside or outside of a computer system, but another computer system, database storage for the computer system, and transmission medium on communication lines.

Figure 3:
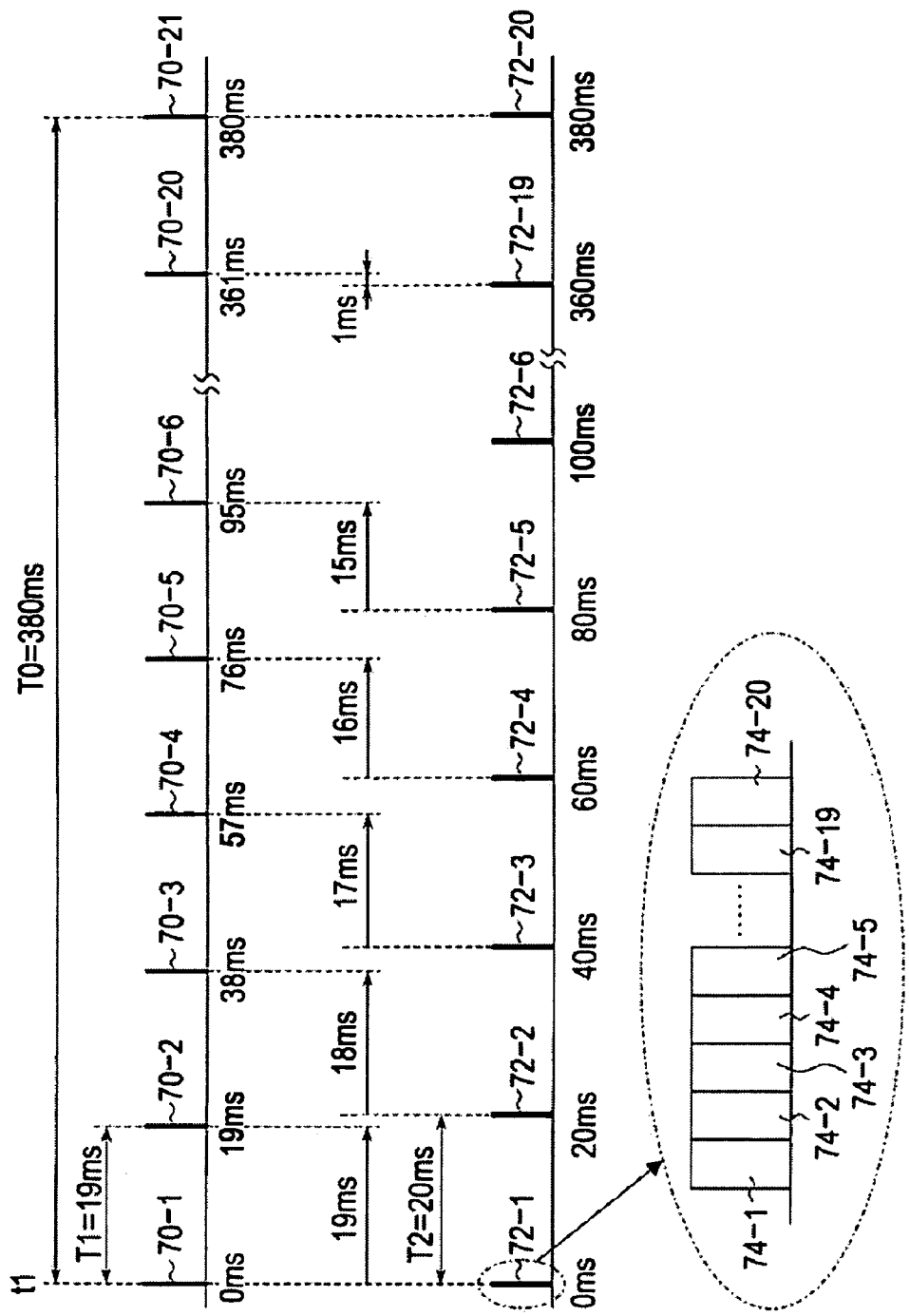
FIG. 3A is a timing chart showing transmission timing of test packets in the embodiment.
FIG. 3B shows elapsed time periods in the embodiment.
FIG. 3C is a timing chart showing a transmission timing of burst loads in the embodiment.

The embodiment has been described with reference to the example in which, as shown in FIG. 3, the test packet transmission time interval T1 is 19 ms, and the burst load transmission time interval T2 is 20 ms, which is 1 ms longer than time interval T1. However, the time periods may be reverse to one another; that is, the test packet transmission time interval T1 may be 20 ms, and the burst load transmission time interval T2 may be 19 ms, which is 1 ms shorter than time interval T1. Even in this case, test packet transmission timings can be generated so that, as shown in FIG. 11, the elapsed time periods are varied in units of 1 ms relative to the burst loads 72.

Further, generally, it is sufficient that a relation of "(T1−T2)=±ΔT" is present between the test packet transmission time interval T1 and the burst load transmission time interval T2, regardless of the length-wise relationship therebetween, that is, regardless of which one of the time periods is relatively long or short. In the relation, ΔT is a unit of the time segment to be allocated for the delay distributions.

Further, in the case of a characteristic with the burst load being set as a 50% load as shown in FIG. 8, when the normal load exceeds 50%, the tilt of the line representing the delay time periods W corresponding to the elapsed time periods Tp reduces, and the burst load transmission time interval exceeds T2 (=20 ms), thereby disabling all the delay distributions to be obtained. Therefore, one of the following measures (1) and (2) can be taken: (1) the burst load transmission time interval T2 is increased; and (2) the fixed burst load is reduced.

The present invention includes appropriate modifications or alterations deflection without departing from the object and advantages of the invention. Further, the present invention is not limited by the numeric values shown and described in the above-described embodiment and examples.

What is claimed is:

1. A network load detection system comprising:
a test packet transmitting unit transmitting test packets to a to-be-measured communication link at a predetermined first time interval;
a burst load transmitting unit transmitting burst loads each including a series of a plurality of load packets to the communication link at a predetermined second time interval different from the first time interval;
a delay time measuring unit performing measurement of delay time periods in a manner that a plurality of test packets transmitted by varying elapsed time periods each from an instance of transmission of the burst load to an instance of transmission of the test packet are received from the communication link in a fluctuating time interval determined in accordance with the first and second time periods, and delay time periods corresponding to the elapsed time periods for the respective test packets are measured;
a delay distribution generating unit generating delay distributions indicative of packet occurrence frequencies in relation to a delay time period of the communication link in accordance with the measured delay time periods; and
a load calculating unit calculating a network load in accordance with occurrence frequencies in a specific section of the generated delay distributions.

2. A network load detection system as claimed in claim 1, wherein the test packet transmitting unit and the burst load transmitting unit, respectively, initiate the transmission of the test packets and the transmission of the burst loads by synchronizing transmission initiation timings thereof with one another.

3. A network load detection system as claimed in claim 1, wherein the delay time measuring unit sets the fluctuating time interval to an absolute value of a value obtained in a manner that a product of a multiplication of the first time interval times the second time interval is divided by a greatest common divisor of the first time interval and the second time interval.

4. A network load detection system as claimed in claim 1, wherein the delay time measuring unit calculates delay time periods measured in a time period exceeding the fluctuating time interval.

5. A network load detection system as claimed in claim 1, wherein the delay distribution generating unit obtains, as an occurrence frequency of the delay distributions, a rate to the second time interval of elapsed time periods included in delay time period zones divided into a plurality of predetermined lengths from delay time periods of test packets corresponding to the elapsed time periods each from the instant of transmission of the burst load to the instant of transmission of the test packet.

6. A network load detection system as claimed in claim 1, wherein the load calculating unit obtains a network load L from the relation of $$D = \frac{a}{bL^2 + cL + d}$$

where
D denotes an occurrence frequency of the delay distributions, excepting both ends, obtained by the delay distribution generating unit; and
a, b, c, and d denote respective constants.

7. A network load detection system as claimed in claim 6, wherein the constants a, b, c, and d are given as:

$$a = -\frac{100 T_s}{T_a \cdot ft}$$

$$b = \frac{T_s^2}{ft^2}$$

$$c = \frac{T_s^2}{T_a \cdot ft} - \frac{2T_s}{ft}$$

-continued $$d = -\left(1 - \frac{T_s}{T_a}\right)$$

where
ft denotes a frame time period (transmission time interval for the burst loads) [ms];
Ta denotes a time interval [ms] for the arrival of the burst load packets within the transmission time interval; and
Ts denotes a packet processing time interval [ms].

8. A network load detection method comprising:
a test packet transmitting step of transmitting test packets to a to-be-measured communication link at a predetermined first time interval;
a burst load transmitting step of transmitting burst loads each including a series of a plurality of load packets to the communication link at a predetermined second time interval different from the first time interval;
a delay time measuring step of performing measurement of delay time periods in a manner that a plurality of test packets transmitted by varying elapsed time periods each from an instance of transmission of the burst load to an instance of transmission of the test packet are received from the communication link in a fluctuating time interval determined in accordance with the first and second time periods, and delay time periods corresponding to the elapsed time periods for the respective test packets are measured;
a delay distribution generating step of generating delay distributions indicative of packet occurrence frequencies in relation to a delay time period of the communication link in accordance with the measured delay time periods; and
a load calculating step of calculating a network load in accordance with occurrence frequencies in a specific section of the generated delay distributions.

9. A network load detection method as claimed in claim 8, wherein the test packet transmitting step and the burst load transmitting step, respectively, initiate to transmission of the test packets and the transmission of the burst loads by synchronizing transmission initiation timings thereof with one another.

10. A network load detection method as claimed in claim 8, wherein the delay time measuring step sets the fluctuating time interval to an absolute value of a value obtained in a manner that a product of a multiplication of the first time interval times the second time interval is divided by a greatest common divisor of the first time interval and the second time interval.

11. A network load detection method as claimed in claim 8, wherein the delay time measuring step calculates delay time periods of a plurality of test packets received from the communication link in the fluctuating time interval in a manner that delay time periods are measured in a time period of an arbitrary integer multiple of the fluctuating time interval.

12. A network load detection method as claimed in claim 8, wherein the delay distribution generating step obtains, as an occurrence frequency of the delay distributions, a rate to the second time interval of elapsed time periods included in delay time period zones divided into a plurality of predetermined lengths from delay time periods of test packets corresponding to the elapsed time periods each from the instant of transmission of the burst load to the instant of transmission of the test packet.

13. A network load detection method as claimed in claim 8, wherein the load calculating step obtains a network load L from the relation of $$D = \frac{a}{bL^2 + cL + d}$$

where
D denotes an occurrence frequency of the delay distributions, excepting both ends, obtained by the delay distribution generating unit; and
a, b, c, and d denote respective constants.

14. A network load detection method as claimed in claim 13, wherein the constants a, b, c, and d are given as:

$$a = -\frac{100T_s}{T_a \cdot ft}$$

$$b = \frac{T_s^2}{ft^2}$$

$$c = \frac{T_s^2}{T_a \cdot ft} - \frac{2T_s}{ft}$$

$$d = -\left(1 - \frac{T_s}{T_a}\right)$$

where
ft denotes a frame time period (transmission time interval for the burst loads) [ms];
Ta denotes a time interval [ms] for the arrival of the burst load packets within the transmission time interval; and
Ts denotes a packet processing time interval [ms].

15. A network load detection apparatus detecting a load on a communication link, wherein test packets are transmitted to a communication link at a first time interval, and burst loads each including a plurality of a series of load packets are transmitted to the communication link at a second time interval different from the first time interval, the apparatus comprising:
a delay time measuring unit performing measurement of delay time periods in a manner that a plurality of test packets transmitted by varying elapsed time periods each from an instant of transmission of the burst load to an instant of transmission of the test packet are received from the communication link in a fluctuating time interval determined in accordance with the first and second time periods, and delay time periods corresponding to the elapsed time periods for the respective test packets are measured;
a delay distribution generating unit generating delay distributions indicative of packet occurrence frequencies in relation to a delay time period of the communication link in accordance with the measured delay time periods; and
a load calculating unit calculating a network load in accordance with occurrence frequencies in a specific section of the generated delay distributions.

16. A network load detection apparatus as claimed in claim 15, the transmission of the test packets and the transmission of the burst loads are initiated by synchronizing transmission initiation timings thereof with one another.

17. A network load detection apparatus as claimed in claim 15, wherein the delay time measuring unit sets the fluctuating time interval to an absolute value of a value obtained in a manner that a product of a multiplication of the first time interval times the second time interval is divided by a greatest common divisor of the first time interval and the second time interval.

18. A network load detection apparatus as claimed in claim 15, wherein the delay time measuring unit calculates delay time periods of a plurality of test packets received from the communication link in the fluctuating time interval in a manner that delay time periods are measured in a time period of an arbitrary integer multiple of the fluctuating time interval.

19. A network load detection apparatus as claimed in claim 15, wherein the delay distribution generating unit obtains, as an occurrence frequency of the delay distributions, a rate to the second time interval of elapsed time periods included in delay time period zones divided into a plurality of predetermined lengths from delay time periods of test packets corresponding to the elapsed time periods each from the instant of transmission of the burst load to the instant of transmission of the test packet.

20. A network load detection apparatus as claimed in claim 15, wherein the load calculating unit obtains a network load L from the relation of $$D = \frac{a}{bL^2 + cL + d}$$

where

D denotes an occurrence frequency of the delay distributions, excepting both ends, obtained by the delay distribution generating unit; and a, b, c, and d denote respective constants.

21. A network load detection apparatus as claimed in claim 20, wherein the constants a, b, c, and d are given as:

$$a = -\frac{100 T_s}{T_a \cdot ft}$$

$$b = \frac{T_s^2}{ft^2}$$

$$c = \frac{T_s^2}{T_a \cdot ft} - \frac{2 T_s}{ft}$$

$$d = -\left(1 - \frac{T_s}{T_a}\right)$$

where ft denotes a frame time period (transmission time interval for the burst loads) [ms];

Ta denotes a time interval [ms] for the arrival of the burst load packets within the transmission time interval; and Ts denotes a packet processing time interval [ms].

22. A network load detection program stored on a computer-readable storage medium for a computer of a network load detection apparatus that operates to detect a load on a communication link, wherein test packets are transmitted to the communication link at a first time interval, and burst loads each including a plurality of a series of load packets are transmitted to the communication link at a second time interval different from the first time interval, the program comprising:

a delay time measuring step of performing measurement of delay time periods in a manner that a plurality of test packets transmitted by varying elapsed time periods each from an instant of transmission of the burst load to an instant of transmission of the test packet are received from the communication link in a fluctuating time interval determined in accordance with the first and second time periods, and delay time periods corresponding to the elapsed time periods for the respective test packets are measured;

a delay distribution generating step of generating delay distributions indicative of packet occurrence frequencies in relation to a delay time period of the communication link in accordance with the measured delay time periods; and a load calculating step of calculating a network load in accordance with occurrence frequencies in a specific section of the generated delay distributions.

\* \* \* \* \*

UNITED STATES PATENT AND TRADEMARK OFFICE
CERTIFICATE OF CORRECTION

| | | |
|---|---|---|
| PATENT NO. | : 7,729,266 B2 | |
| APPLICATION NO. | : 12/037702 | |
| DATED | : June 1, 2010 | |
| INVENTOR(S) | : Sumiyo Okada | |

It is certified that error appears in the above-identified patent and that said Letters Patent is hereby corrected as shown below:

In column 19, line 42, after "initiate", delete "to" and insert --the--.

Signed and Sealed this
Seventeenth Day of May, 2011

David J. Kappos
*Director of the United States Patent and Trademark Office*